(12) United States Patent
Tanba et al.

(10) Patent No.: US 8,874,289 B2
(45) Date of Patent: Oct. 28, 2014

(54) VEHICULAR POWER TRANSMISSION CONTROL APPARATUS

(75) Inventors: Toshio Tanba, Kariya (JP); Kan Sasaki, Nagoya (JP); Takeshige Miyazaki, Chiryu (JP); Yousuke Hayashi, Toyota (JP); Hiroki Hatori, Nishio (JP)

(73) Assignee: Aisin AI Co., Ltd., Nishio-Shi (JP)

( * ) Notice: Subject to any disclaimer, the term of this patent is extended or adjusted under 35 U.S.C. 154(b) by 749 days.

(21) Appl. No.: 12/754,931

(22) Filed: Apr. 6, 2010

(65) Prior Publication Data

US 2010/0262323 A1 Oct. 14, 2010

(30) Foreign Application Priority Data

Apr. 8, 2009 (JP) ................................. 2009-093802

(51) Int. Cl.

| | |
|---|---|
| G06F 19/00 | (2011.01) |
| B60W 10/08 | (2006.01) |
| B60K 6/48 | (2007.10) |
| B60W 30/182 | (2012.01) |
| B60K 6/387 | (2007.10) |
| B60W 10/06 | (2006.01) |
| B60W 20/00 | (2006.01) |

(52) U.S. Cl.
CPC ............... B60K 6/48 (2013.01); *Y02T 10/6252* (2013.01); B60W 10/08 (2013.01); *B60W 20/00* (2013.01); *B60K 2006/4825* (2013.01); B60W 30/182 (2013.01); *Y02T 10/6286* (2013.01); *B60W 2510/0604* (2013.01); *Y02T 10/626* (2013.01); *B60K 2006/4808* (2013.01); *B60W 2540/10* (2013.01); B60K 6/387 (2013.01); *Y02T 10/6221* (2013.01); B60W 10/06 (2013.01)
USPC .................................. 701/22; 180/5.1; 477/4

(58) Field of Classification Search
CPC ..................................................... Y02T 10/705
USPC ................. 310/114; 477/3, 4; 701/22, 55, 51; 180/65.275, 65; 475/5
See application file for complete search history.

(56) References Cited

U.S. PATENT DOCUMENTS 5,844,342 A * 12/1998 Miyatani et al. ............... 310/114
6,077,186 A * 6/2000 Kojima et al. .................... 477/3
(Continued)

FOREIGN PATENT DOCUMENTS

JP 2000-224710 A1 8/2000

OTHER PUBLICATIONS

U.S. Appl. No. 12/720,940, filed Mar. 10, 2010, Tanba et al.
(Continued)

*Primary Examiner* — Hiep V Nguyen
*Assistant Examiner* — Teresa Woods
(74) *Attorney, Agent, or Firm* — Burr & Brown, PLLC

(57) ABSTRACT

An apparatus, applied to a vehicle having an internal combustion engine and an electric motor as power sources, comprises a changeover mechanism which is able to change a connection state of an electric motor output shaft to any one of "an IN-Connection State" in which a power transmission path is provided between a transmission input shaft and the electric motor output shaft, "an OUT-Connection State" in which a power transmission path is provided between the transmission output shaft and the electric motor output shaft, and "a neutral state" in which no transmission path therebetween is provided. When a changeover condition is satisfied, a period is provided in which a sum Ts of an internal-combustion-engine-side-output-torque Te and an electric-motor-side-output-torque Tm coincides with a required driving torque Tr, and an electric motor torque continues to be zero.

9 Claims, 13 Drawing Sheets

(56) References Cited

U.S. PATENT DOCUMENTS

| | | | |
|---|---|---|---|
| 6,692,403 B2* | 2/2004 | Charaudeau et al. | 477/3 |
| 6,726,592 B2* | 4/2004 | Kotani | 477/4 |
| 6,942,490 B2* | 9/2005 | Tsukashima et al. | 439/34 |
| 6,971,969 B2* | 12/2005 | Kitagawa et al. | 477/3 |
| 7,070,530 B2* | 7/2006 | Ai et al. | 475/5 |
| 7,200,476 B2* | 4/2007 | Cawthorne et al. | 701/51 |
| 7,219,757 B2* | 5/2007 | Tomita et al. | 180/65.275 |
| 7,286,922 B1* | 10/2007 | Fischer et al. | 701/51 |
| 8,129,951 B2* | 3/2012 | Turner et al. | 320/134 |
| 8,353,374 B2* | 1/2013 | Sugawara et al. | 180/65.1 |
| 8,478,466 B2* | 7/2013 | Luo et al. | 701/22 |
| 8,676,414 B2* | 3/2014 | Luo et al. | 701/22 |
| 2002/0040818 A1* | 4/2002 | Maruyama | 180/65.2 |
| 2010/0116570 A1* | 5/2010 | Sugawara et al. | 180/65.1 |

OTHER PUBLICATIONS

U.S. Appl. No. 12/720,956, filed Mar. 10, 2010, Miyazaki et al.
U.S. Appl. No. 12/720,964, filed Mar. 10, 2010, Miyazaki et al.
U.S. Appl. No. 12/720,979, filed Mar. 10, 2010, Miyazaki et al.
U.S. Appl. No. 12/720,984, filed Mar. 10, 2010, Miyazaki et al.
U.S. Appl. No. 12/754,946, filed Apr. 6, 2010, Hatori et al.

* cited by examiner

IN-Connection

OUT-Connection non-connection

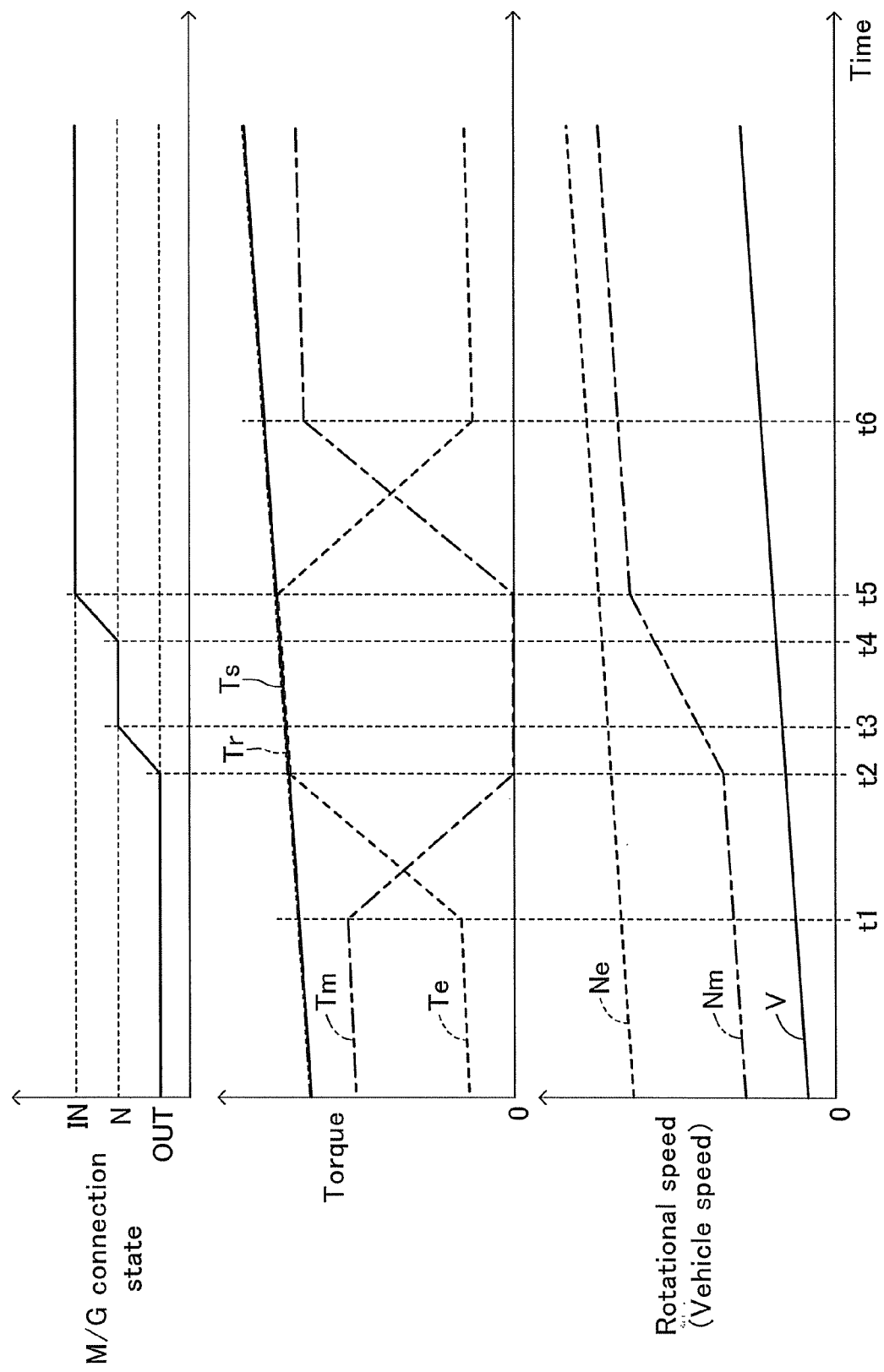

VEHICULAR POWER TRANSMISSION CONTROL APPARATUS

BACKGROUND OF THE INVENTION

1. Field of the Invention

The present invention relates to a vehicular power transmission control apparatus, especially to a vehicular power transmission control apparatus applied to a vehicle comprising an internal combustion engine and an electric motor as power sources.

2. Description of the Related Art

In these days, a so-called hybrid vehicle comprising an internal combustion engine and an electric motor (electric motor generator) as power sources has been developed (refer to, for example, Japanese Unexamined Patent Application Publication No. 2000-224710). In the hybrid vehicle, the electric motor is used as the power source generating a driving torque for driving the vehicle together with the internal combustion engine or by itself, or is used as a power source for starting the internal combustion engine.

Further, the electric motor is used as an electric motor generator for generating a regeneration torque to provide a breaking force to the vehicle, or is used as an electric motor generator for generating an electric power which is supplied to and stored in a battery of the vehicle. These usages of the electric motor can improve a total energy efficiency (fuel consumption) of the vehicle as a whole.

Generally, in the hybrid vehicle, a torque of an output shaft of the internal combustion engine and a torque of an output shaft of the electric motor are controlled in such a manner that a sum of an internal-combustion-engine-side-output-torque and an electric-motor-side-output-torque becomes equal to (coincides with) a required driving torque. The internal-combustion-engine-side-output-torque is a torque which is transmitted to the output shaft of the transmission and which is based on (owing to) a torque of the output shaft of the internal combustion engine. The electric-motor-side-output-torque is a torque which is transmitted to the output shaft of the transmission and which is based on (owing to) a torque of the output shaft of the electric motor. The required driving torque is a torque based on an operation of the acceleration operating member by a driver of the vehicle.

SUMMARY OF THE INVENTION

In the meanwhile, in the hybrid vehicle, there is a case where a connection state (hereinafter, referred to as an "IN-Connection State") is used in which a power transmission path between an output shaft of the electric motor and an input shaft of a transmission is provided/realized, and there is another case where another connection state (hereinafter, referred to as an "OUT-Connection State") is used in which a power transmission path between the output shaft of the electric motor and an output shaft of the transmission (and thus, driving wheels) is provided/realized without involving the transmission.

In the "IN-Connection State", a rotational speed of the output shaft of the electric motor with respect to a vehicle speed can be varied by changing a gear position of the transmission. Accordingly, adjusting the gear position of the transmission can provide an advantage such that the rotational speed of the output shaft of the electric motor can easily be maintained within a range in which an energy conversion efficiency (more specifically, an efficiency in generating the driving torque, the regeneration torque, or the like) is high.

On the other hand, the "OUT-Connection State" provides an advantage such that a power transfer loss can be made smaller, since the power transmission path does not involve the transmission having a complicated mechanism. In addition, in the transmission (especially, in a transmission of a type which does not include a torque converter), a power transmission from the input shaft of the transmission to the output shaft of the transmission is generally shut off temporarily during a gear position shifting operation (while an operation by which the gear position is changed). Consequently, a rapid change (so-called shift shock) in an acceleration in a front-rear direction of the vehicle tends to occur. However, the "OUT-Connection State" allows the driving torque from the electric motor to be continuously transmitted to the output shaft of the transmission (and therefore to the drive wheels) even during the gear position shifting operation, and therefore provides an advantage such that the shift shock is suppressed.

In view of the above, the applicant of the present invention has already proposed a changeover mechanism which can change/switch a connection state of the output shaft of the electric motor between the IN-Connection State and the OUT-Connection State, in Japanese Patent Application No. 2007-271556. Hereinafter, the connection state of the output shaft of the electric motor may simply be referred to as "an electric-motor-connection-state". The changeover mechanism can further change the electric-motor-connection-state to a state in which neither a power transmission path between the output shaft of the electric motor and the input shaft of the transmission nor a power transmission path between the output shaft of the electric motor and the output shaft of the transmission is provided. Hereinafter, this state is referred to as a "non-connection state".

However, no suggestion has been made as to how a torque of the output shaft of the internal combustion engine and a torque of the output shaft of the electric motor should be controlled, in a period (changeover adjusting period) in which the torque of the output shaft of the internal combustion engine and the torque of the output shaft of the electric motor are adjusted with respect to the changeover operation using the changeover mechanism to change the electric-motor-connection-state.

An object of the present invention is therefore to provide a vehicular power transmission control apparatus applied to a vehicle comprising an internal combustion engine and an electric motor as power sources, the control apparatus being able to appropriately adjust torque of the output shaft of the internal combustion engine and the torque of the output shaft of the electric motor in the changeover adjusting period regarding (with respect to) the changeover of the electric-motor-connection-state.

The vehicular power transmission control apparatus according to the present invention comprises a transmission, a changeover mechanism, required driving torque obtaining means, determining means, and control means.

The transmission comprises: an input shaft to provide/realize a power transmission path between the input shaft of the transmission and an output shaft of the internal combustion engine; and an output shaft to provide/realize a power transmission path between the output shaft of the transmission and drive wheels of the vehicle. The transmission is configured so as to be able to adjust a ratio (transmission reduction ratio) of a rotational speed of the input shaft of the transmission to a rotational speed of the output shaft of the transmission. The transmission may be a multiple gear ratio transmission which can realize/provide any one of a plurality of predetermined reduction ratios different from each other as the transmission reduction ratio, or may be a continuously variable transmission which can adjust a reduction ratio continuously (or in non-stepwise fashion) as the transmission reduction ratio.

Further, the transmission may be "a multiple gear ratio transmission or a continuously variable transmission (so-called automatic transmission (AT))" comprising a torque converter and being configured in such a manner that the gear position shifting operation is automatically performed in accordance with a driving/running condition of the vehicle, or may be "a multiple gear ratio transmission without the torque converter (so-called manual transmission (MT))". If the transmission is the manual transmission, the transmission may be, but not limited to, any one of the following types.

A type in which the gear position shifting operation is performed directly by a force applied to a shift lever from the driver.

A type in which the gear position shifting operation is performed by a drive force generated by an actuator which is driven base on a signal indicative of a position of the shift lever which the driver operates.

A type in which the gear position shifting operation can be automatically performed by a drive force generated by an actuator which is automatically driven in accordance with a driving condition of the vehicle, without depending on an operation of the shift lever by the driver (i.e., a so-called automated manual transmission).

The changeover mechanism is configured so as to change the electric-motor-connection-state to any one of two or more of an input-side-connection state, an output-side-connection state, and a non-connection state, the input-side-connection state (IN-Connection State) being a state in which a power transmission path is provided between the output shaft of the electric motor and the input shaft of the transmission, the output-side-connection state (OUT-Connection State) being a state in which a power transmission path is provided between the output shaft of the electric motor and the output shaft of the transmission without involving the transmission, and the non-connection state being a state in which neither a power transmission path between the output shaft of the electric motor and the input shaft of the transmission, nor a power transmission path between the output shaft of the electric, motor and the output shaft of the transmission is provided.

That is, the changeover mechanism may be, but not limited to, one of the followings.

A changeover mechanism which can change the electric-motor-connection-state into any one of the IN-Connection State and the non-connection state, only.

A changeover mechanism which can change the electric-motor-connection-state into any one of the OUT-Connection State and the non-connection state, only.

A changeover mechanism which can change the electric-motor-connection-state into any one of the IN-Connection State and the OUT-Connection State, only.

A changeover mechanism which can change the electric-motor-connection-state into any one of the IN-Connection State, the OUT-Connection State, and the non-connection state.

Generally, in the IN-Connection State, a ratio (hereinafter, referred to as "a first reduction ratio") of the rotational speed of the output shaft of the electric motor to the rotational speed of the input shaft of the transmission is fixed to a constant (e.g., 1). Hereinafter, a product of "the first reduction ratio" and "the transmission reduction ratio" in the IN-Connection State is referred to as an "IN-connection reduction ratio". "The IN-connection reduction ratio" varies in accordance with a change in "the transmission reduction ratio", the change being caused by the gear position shifting operation of the transmission. On the other hand, in the OUT-Connection State, a ratio of the rotational speed of the output shaft of the electric motor to the rotational speed of the output shaft of the transmission is generally fixed to a constant (e.g., a value larger than 1, or a value close to the transmission reduction ratio corresponding to a 2nd gear position, etc.). Hereinafter, this ratio is referred to as an "OUT-connection reduction ratio". "The OUT-connection reduction ratio" is kept constant even when "the transmission reduction ratio" varies. It should be noted that a ratio (hereinafter, referred to as "a second reduction ratio") of a rotational speed of the output shaft of the internal combustion engine to a rotational speed of the input shaft of the transmission is generally set to a constant (e.g., 1).

The required driving torque obtaining means obtains a required driving torque which is a driving torque required by the driver, based on an operation of the acceleration operating member caused by the driver of the vehicle. For example, the required driving torque is a torque about (regarding) the output shaft of the transmission.

The determining means (judging means) determines whether or not a changeover condition of the electric-motor-connection-state is satisfied. The determining means may be configured in such a manner that the determining means determines whether or not the changeover condition is satisfied based on, for example, a predetermined map (or a table, etc.) defining a relation between "a combination of a value correlating with a speed of the vehicle and a value correlating with the required driving torque" and "the electric-motor-connection-state". Alternatively, the determining means may be configured in such a manner that it determines that the changeover condition is satisfied, when the rotational speed of the output of the electric motor becomes larger than a predetermined value, or when the either the torque of the output shaft of the electric motor or the torque of the output shaft of the internal combustion engine becomes larger than a predetermined value, and so on. It should be noted that an example of the value correlating with the speed of the vehicle may be the speed of the vehicle itself, the rotational speed of the input shaft of the transmission, the rotational speed of the output shaft of the internal combustion engine, or the rotational speed of the output shaft of the electric motor. An example of the value correlating with the required driving torque may be an operating amount of the acceleration operating member, or an opening degree of a throttle valve disposed in an intake passage of the internal combustion engine.

The control means controls, based on at least the required driving torque, the torque of the output shaft of the internal combustion engine and the torque of the output shaft of the electric motor in such a manner that a sum of an internal-combustion-engine-side-output-torque and an electric-motor-side-output-torque becomes equal to the required driving torque. Further, the control means controls the change over mechanism when (and after) the changeover condition is satisfied. The internal-combustion-engine-side-output-torque is the torque which is transmitted to the output shaft of the transmission and which is based on (owing to) the torque of the output shaft of the internal combustion engine. The electric-motor-side-output-torque is the torque which is transmitted to the output shaft of the transmission and which is based on (owing to) the torque of the output shaft of the electric motor.

More specifically, the internal-combustion-engine-side-output-torque is equal to a value obtained by multiplying the torque of the output shaft of the internal combustion engine by a product of "the second reduction ratio" and "the transmission reduction ratio". The electric-motor-side-output-torque is equal to a value obtained by multiplying the torque of the output shaft of the electric motor by "the In-connection reduction ratio", when the electric-motor-connection-state is in the IN-Connection State. The electric-motor-side-output-torque is equal to a value obtained by multiplying the torque of the output shaft of the electric motor by "the OUT-connection reduction ratio", when the electric-motor-connection-state is in the OUT-Connection State.

The vehicular power transmission control apparatus according to the present invention is characterized in that the control means is configured so as to, when and after the changeover condition is satisfied, adjust the torque of the output shaft of the internal combustion engine and the torque of the output shaft of the electric motor in such a manner that the sum of the internal-combustion-engine-side-output-torque and the electric-motor-side-output-torque becomes equal to (coincides with) the required driving torque over a period (changeover adjusting period) in which the torque of the output shaft of the internal combustion engine and the torque of the output shaft of the electric motor are adjusted with respect to a changeover operation of the connection state of the output shaft of the electric motor, and in such a manner that a period in which the torque of the output shaft of the electric motor continues to be zero or a value close to zero is included within the changeover adjusting period, and so as to control the changeover mechanism in such a manner that the changeover operation is performed in the changeover adjusting period.

The changeover operation means a movement of a moving member (e.g., a sleeve, and the like) which moves in the changeover mechanism to change the electric-motor-connection-state. Accordingly, a start of the changeover operation corresponds to a start of the movement of the moving member, and an end of the changeover operation corresponds to an end of the movement of the moving member.

According to the configuration described above, the torque of the output shaft of the internal combustion engine and the torque of the output shaft of the electric motor are adjusted so that "the period in which the torque of the output shaft of the electric motor continues to be zero or the value close to zero" is included/provided in the changeover adjusting period. Accordingly, for example, the moving member in the changeover mechanism can be smoothly moved by controlling the changeover mechanism in such a manner that the changeover operation starts and ends within "the period in which the torque of the output shaft of the electric motor continues to be zero or the value close to zero".

Further, the torque of the output shaft of the internal combustion engine and the torque of the output shaft of the electric motor are adjusted in such a manner that the sum of the internal-combustion-engine-side-output-torque and the electric-motor-side-output-torque becomes equal to (coincides with) the required driving torque over the changeover adjusting period. Accordingly, an occurrence of a rapid change (shift shock with/due to the changeover operation) in an acceleration in the front-rear direction of the vehicle can be suppressed, the rapid change being caused by the changeover operation.

Next will be described a case in which, while the electric-motor-connection-state is (in) either one of the IN-Connection State and the OUT-Connection State, the changeover condition of the electric-motor-connection-state from the either one of the IN-Connection State and the OUT-Connection State to the other is satisfied. More specifically, in this case, the control means may be configured so as to adjust the torque of the output shaft of the internal combustion engine and the torque of the output shaft of the electric motor when and after such a changeover condition is satisfied, in such a manner that the changeover adjusting period is composed of a first period, a second period, and a third period. The first period is a period in which the torque of the output shaft of the electric motor decreases toward zero or the value close to zero, and the torque of the output shaft of the internal combustion engine increases. The second period is a period in which the torque of the output shaft of the electric motor continues to be zero or the value close to zero, and the internal-combustion-engine-side-output-torque coincides with the required driving torque. The third period is a period in which the torque of the output shaft of the electric motor increases from zero or the value close to zero, and the torque of the output shaft of the internal combustion engine decreases. In addition, the control means may be configured so as to control the changeover mechanism in such a manner that the changeover operation starts at a changing time from the first period to the second period or at a time close to the changing time from the first period to the second period, and the changeover operation ends at a changing time from the second period to the third period or at a time close to the changing time from the second period to the third period.

Further, the control means may be configured so as to adjust a rotational speed of the output shaft of the electric motor in the second period in order to make the rotational speed of the output shaft of the electric motor become equal to (or coincide with) a value corresponding to the electric-motor-connection-state after the changeover operation, at the end of the second period (or a timing close to the end of the second period).

Further, as in the case in which the changeover condition from the one of the IN-Connection State and the OUT-Connection State to the other is satisfied, and it is determined that the internal-combustion-engine-side-output-torque can not reach (will not be able to reach) the required driving torque within the changeover adjusting period, it is preferable that the control means be configured so as to adjust the torque of the output shaft of the internal combustion engine and the torque of the output shaft of the electric motor in the first period, in such a manner that a decreasing inclination of the torque of the output shaft of the electric motor is small (or smaller) in a period from a start of the first period to a certain timing in the middle of the first period and is large (or larger) in a period from the certain timing in the middle of the first period to an end of the first period, and an increasing inclination of the torque of the output shaft of the internal combustion engine is small (or smaller) over the first period, compared to (or than each corresponding inclinations in) a case in which it is determined that the internal-combustion-engine-side-output-torque can reach (will be able to reach) the required driving torque in the changeover adjusting period. It should be noted that "the internal-combustion-engine-side-output-torque can not reach the required driving torque" means that "a maximum value within a range in which the internal-combustion-engine-side-output-torque in the current/preset driving/running condition can be adjusted" is smaller than the required driving torque. In this case, in the changeover adjusting period, the internal-combustion-engine-side-output-torque is adjusted so as to be equal to (coincide with) the maximum value within the range in which the internal-combustion-engine-side-output-torque can be adjusted.

In the case in which the internal-combustion-engine-side-output-torque can not reach the required driving torque in the changeover adjusting period, a case may occur in which a total torque of the output shaft of the transmission can not reach the required driving torque (i.e., a case in which the torque is short/insufficient) over a period including the second period in which the torque of the output shaft of the electric motor is set/controlled to be zero or the value close to zero (specifically, over a period from either the start of the first period or a time in the middle of the first period to either a time in the middle of the third period or the end of the third period). In this case, according to the configuration above, a start time of the period in which the torque is short/insufficient can be delayed as much as possible (and accordingly, the period in which the torque is short/insufficient can be shortened as much as possible) (refer to FIG. 7, the details will be described later).

Similarly, in the case in which it is determined that the internal-combustion-engine-side-output-torque can not reach (will not be able to reach) the required driving torque in the changeover adjusting period, it is preferable that the control means be configured so as to adjust the torque of the output shaft of the internal combustion engine and the torque of the output shaft of the electric motor in the third period, in such a manner that an increasing inclination of the torque of the output shaft of the electric motor is large (or larger) in a period from a start of the third period to a certain timing in the middle of the third period and is small (or smaller) in a period from the certain timing in the middle of the third period to an end of the third period, and a decreasing inclination of the torque of the output shaft of the internal combustion engine is small (smaller) over the third period, compared to (or than each corresponding inclinations in) the case in which it is determined that the internal-combustion-engine-side-output-torque can reach (will be able to reach) the required driving torque in the changeover adjusting period.

According to the configuration above, an end time of the period in which the torque is short/insufficient can be made to come earlier, as much as possible (and accordingly, the period in which the torque is short/insufficient can be shortened as much as possible) (refer to FIG. 7, the details will be described later).

Further, the control means may be configured so as to control the torque of the output shaft of the internal combustion engine and the torque of the output shaft of the electric motor, in a condition in which the torque of the output shaft of the internal combustion engine coincides with a best characteristic torque which allows a predetermined characteristic of the internal combustion engine to be the best, and in a first condition in which a required electric motor torque is within a range of a (maximum) torque which the electric motor can generate, the required electric motor torque being a torque of the output shaft of the electric motor necessary to make the sum of the internal-combustion-engine-side-output-torque and the electric-motor-side-output-torque coincide with the required driving torque, in such a manner that the torque of the output shaft of the internal combustion engine coincides with the best characteristic torque, and the torque of the output shaft of the electric motor coincides with the required electric motor torque; and the control means may be configured so as to control the torque of the output shaft of the internal combustion engine and the torque of the output shaft of the electric motor, in the condition in which the torque of the output shaft of the internal combustion engine coincides with the best characteristic torque, and in a second condition in which the required electric motor torque is out of the range of a (maximum) torque which the electric motor can generate, in such a manner that the torque of the output shaft of the electric motor coincides with a maximum value within the range of a (maximum) torque which the electric motor can generate, and the torque of the output shaft of the internal combustion engine coincides with a torque necessary to make the sum of the internal-combustion-engine-side-output-torque and the electric-motor-side-output-torque coincide with the required driving torque.

According to the configuration described above, in the first condition, the predetermined characteristic of the internal combustion engine can be the best by setting the torque of the output shaft of the internal combustion engine at "the best characteristic torque." For example, if "the predetermined characteristic" is a fuel consumption rate, the fuel consumption rate can be minimized. Similarly, in the second condition, the torque of the output shaft of the internal combustion engine can be set to a value as close to "the best characteristic torque" as possible, by setting the torque of the output shaft of the electric motor at the maximum torque. Consequently, the predetermined characteristic of the internal combustion engine can be improved as much as possible. For example, if "the predetermined characteristic" is the fuel consumption rate, the fuel consumption rate can be decreased as much as possible.

As described above, in the case in which the torque of the output shaft of the internal combustion engine and the torque of the output shaft of the electric motor are controlled in consideration of the predetermined characteristic of the internal combustion engine, it is preferable that the determining means be configured so as to determine, in a case in which the connection state of an output shaft of the electric motor is in one of the input-side-connection state and the output-side-connection state and in the second condition, when "the torque of the output shaft of the internal combustion engine in the other one of the input-side-connection state and the output-side-connection state" is closer to the best characteristic torque than "the torque of the output shaft of the internal combustion engine in the one of the input-side-connection state and the output-side-connection state," that the changeover condition of the electric-motor-connection-state from the one of the input-side-connection state and the output-side-connection state to the other is satisfied.

According to the configuration described above, when the torque of the output shaft of the internal combustion engine becomes closer to "the best characteristic torque" by changing the electric-motor-connection-state from the one of the input-side-connection state and the output-side-connection state (i.e., from the current/present electric-motor-connection-state) to the other one of the states, the changeover condition is satisfied to change the electric-motor-connection-state from the one of the states to the other one of the states. Accordingly, the electric-motor-connection-state is changed over from the one of the input-side-connection state and the output-side-connection state to the other one of the states based on the satisfaction of the changeover condition. Consequently, the torque of the output shaft of the internal combustion engine can be made much closer to "the best characteristic torque".

It is preferable that the vehicular power transmission control apparatus according to the present invention be applied to the vehicle having the automated manual transmission described above as the transmission. In this case, a clutch mechanism is provided between the output shaft of the internal combustion engine and the input shaft of the transmission. The clutch mechanism can shut (break/terminate) or provide (realize) a power transmission path between the output shaft of the internal combustion engine and the input shaft of the transmission. In addition, in this case, the transmission does not comprise the torque converter, but is the multiple gear ratio transmission which can realize any one of a plurality of predetermined reduction ratios different from one another as the transmission reduction ratio. Further, the control means is configured so as to control, based on the driving condition (e.g., the vehicle speed and the required driving torque) of the vehicle, shutting and providing of the power transmission path by the clutch mechanism, and the gear position of the transmission (i.e., the transmission reduction ratio)

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which:

FIG. 3 is a time-line chart showing a change in control states of an E/G and an M/G in a case in which a changeover operation from the OUT-Connection State to the IN-Connection State is performed;

DETAILED DESCRIPTION OF THE INVENTION

Next will be described embodiments of a vehicular power transmission control apparatus according to the present invention with reference to the drawings.
(Configuration)

Figure 1:
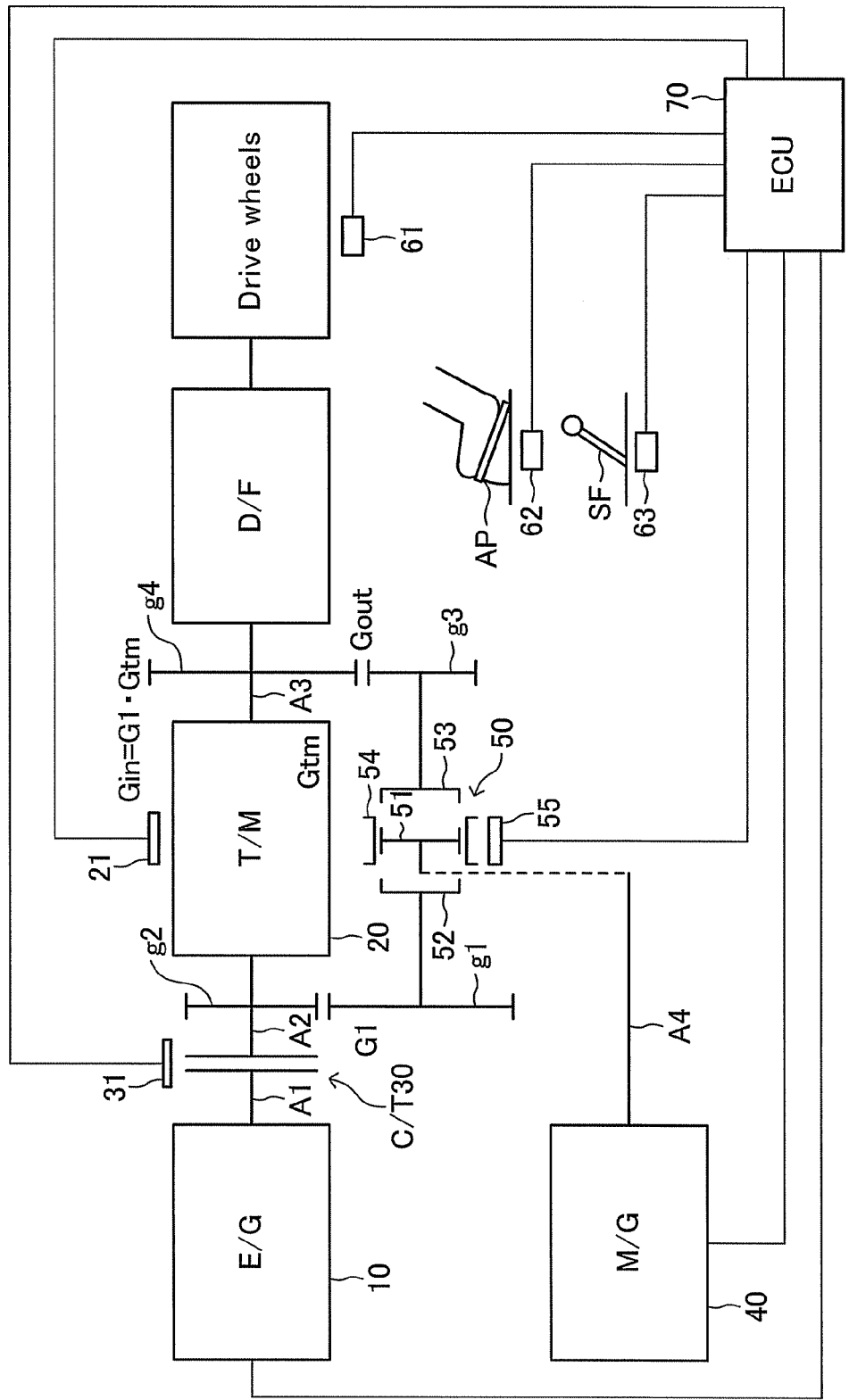
FIG. 1 is a schematic view of a vehicle which mounts a vehicular power transmission control apparatus according to an embodiment of the present invention.

FIG. 1 shows a schematic configuration of a vehicle mounting a vehicular power transmission control apparatus (hereinafter, referred to as a "present apparatus") according to an embodiment of the present invention. The present apparatus is applied to the vehicle comprising, as its power sources, an internal combustion engine and a motor generator. The vehicle comprises a so-called automated manual transmission, which uses a multiple gear ratio transmission, but which does not have a torque converter.

The vehicle comprises the engine (E/G) 10, the transmission (T/M) 20, a clutch (C/T) 30, the motor generator (M/G) 40, and a changeover mechanism 50. The E/G 10 is one of well-known internal combustion engines. The E/G 10 may be a gasoline engine which uses a gasoline as a fuel, or a diesel engine which uses a light diesel oil as a fuel. An output shaft A1 of the E/G 10 is connected to an input shaft A2 of the T/M 20 through the C/T 30.

The T/M 20 is one of well-known multiple gear ratio transmissions. The T/M 20 has a plurality of gear positions (e.g., five gear positions) as forward gear positions, one gear position as a reverse gear position, and a neutral gear position. The T/M 20 does not comprise a torque convertor. Hereinafter, the gear positions as forward gear positions and the gear position as the reverse gear position are referred to as "gear positions for driving." When any one of the gear positions for driving is realized/achieved, a power transmission path between the input shaft A2 and the output shaft A3 of the T/M 20 is realized/provided. When the neutral gear position is realized/achieved, a power transmission path between the output shafts A2 and A3 of the T/M 20 is not realized/provided. When any one of the gear positions for driving is realized/achieved, the T/M 20 is configured so as to be able to set a transmission reduction ratio Gtm at one of a plurality of reduction ratios. The transmission reduction ratio Gtm is a ratio of a rotational speed of the input shaft A2 to a rotational speed of the output shaft A3. The T/M 20 changes/shifts the gear position (i.e. the transmission reduction ratio) only by controlling a T/M actuator 21.

The C/T 30 comprises one of well-known structures and is configured in such a manner that the UT 30 can shut-off (break) and provide (completely-provide (or fully-provide)—incompletely-provide (or half-provide-half-shut)) a power transmission path between the output shaft A1 of the E/G 10 and the input shaft A2 of the T/M 20. In the vehicle, a clutch pedal is not provided. A state-of-connecting of the C/T 30 is controlled only by an actuator 31. When the C/T 30 is in a complete-connection state (i.e., the power transmission path between the output shaft A1 of the E/G 10 and the input shaft A2 of the T/M 20 is completely provided/realized), the output shaft A1 of the E/G 10 and the input shaft A2 of the T/M 20 rotate at the same rotational speed, and accordingly, "the second reduction rate" described above becomes equal to "1".

The M/G 40 comprises one of well-known structures (e.g., an AC synchronous motor), and is configured in such a manner that a rotor (not shown) rotates integrally with an output shaft A4. The M/G 40 functions as the power source as well as the electric power generator.

The changeover mechanism 50 is a mechanism which changes (over) a connection state of the output shaft A4 of the M/G 40. The changeover mechanism 50 comprises a connection piece 51 which rotates integrally with the output shaft A4 of the M/G 40, a connection piece 52 which rotates integrally with a gear g1, a connection piece 53 which rotates integrally with a gear g3, a sleeve 54, and a changeover actuator 55. The gear g1 always meshes with the gear g2 which rotates integrally with the input shaft A2 of the T/M 20. The gear g3 always meshes with a gear g4 which rotates integrally with the output shaft A3 of the T/M 20.

The sleeve 54 is provided so as to be coaxially with the output shaft A4 of the M/G 40 and movable in an axial direction of the output shaft A4 of the M/G 40. A position of the sleeve 54 along the axial direction is controlled by the changeover actuator 55. The sleeve 54 is able to spline-engage with the connection pieces 51, 52, and 53.

Figure 2A:
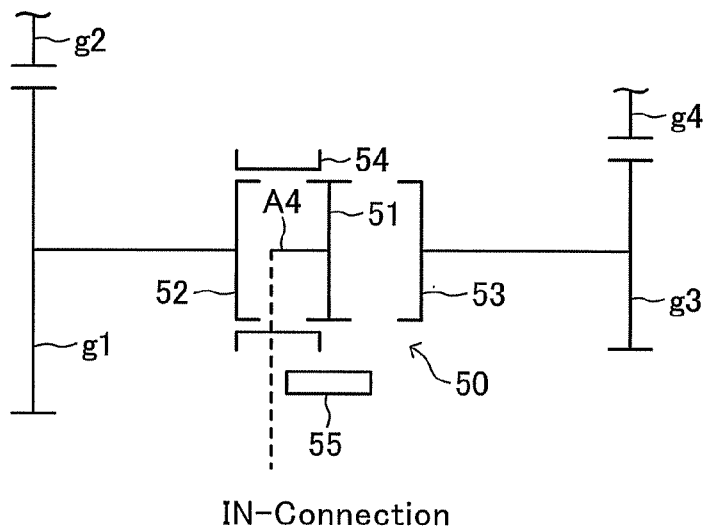
FIG. 2A is a schematic view showing one of three states which the changeover mechanism shown in FIG. 1 can realize.

When the sleeve 54 is controlled to an IN-connection position shown in FIG. 2A, the sleeve 54 spline-engages with the connection pieces 51 and 52. Accordingly, a power transmission path between the input shaft A2 of the T/M 20 and the output shaft A4 of the M/G 40 is realized/provided through the gear g1 and the gear g2. This state is referred to as an "IN-Connection State".

In the IN-Connection State, a ratio of a rotational speed of the output shaft A4 of the M/G 40 to a rotational speed of the input shaft A2 of the T/M 20 is referred to as a "first reduction ratio G1", and a product (G1·Gtm) of the first reduction ratio G1 and the transmission reduction ratio Gtm is referred to as an "IN-connection reduction ratio Gin". In the present example, G1=(the number of teeth of the gear g2)/(the number of teeth of the gear g1), and therefore, Gin=Gtm·(the number of teeth of the gear g2)/(the number of teeth of the gear g1). That is, the IN-connection reduction ratio Gin varies in accordance with a change in the gear position of the T/M 20.

Figure 2B:
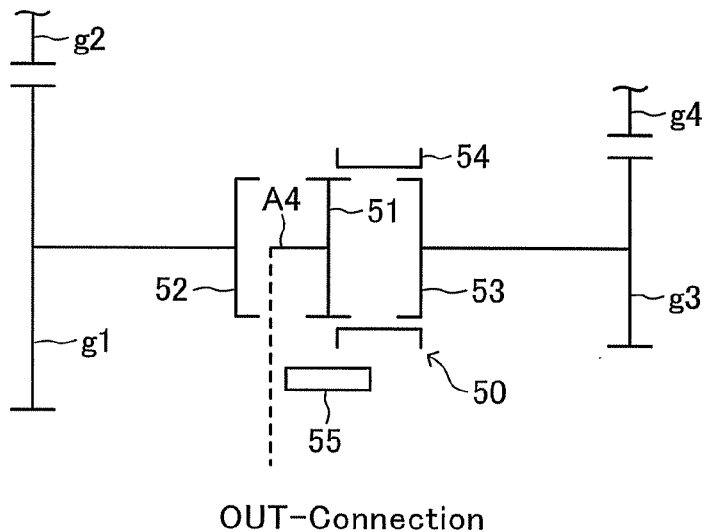
FIG. 2B is a schematic view showing one of three states which the changeover mechanism shown in FIG. 1 can realize.

When the sleeve 54 is controlled to an OUT-connection position shown in FIG. 2B, the sleeve 54 spline-engages with the connection pieces 51 and 53. Accordingly, a power transmission path between the output shaft A3 of the T/M 20 and the output shaft A4 of the M/G 40 is realized/provided through the gear g3 and the gear g4, without involving the T/M 20. This state is referred to as an "OUT-Connection State".

In the OUT-Connection State, a ratio of a rotational speed of the output shaft A4 of the M/G 40 to a rotational speed of the output shaft A3 of the T/M 20 is referred to as an "OUT-connection reduction ratio Gout". In the present example, the OUT-connection reduction ratio Gout is equal to (the number of teeth of the gear g4)/(the number of teeth of the gear g3) and thus is constant. That is, the OUT-connection reduction ratio Gout does not vary in accordance with a change in the gear position of the T/M 20.

Figure 2C:
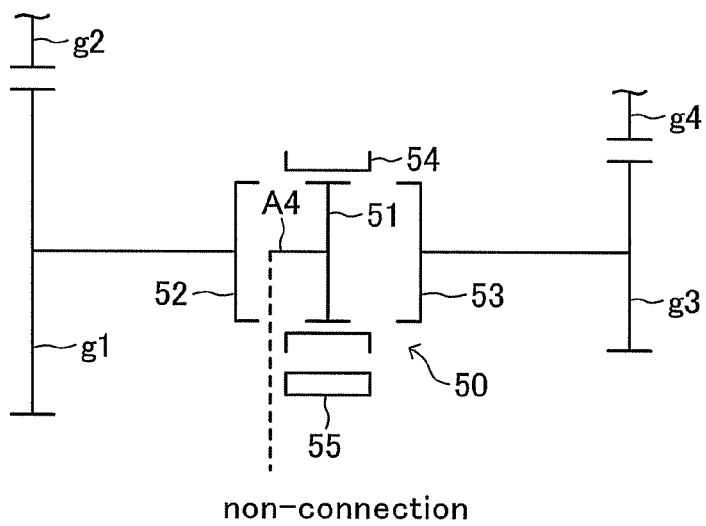
FIG. 2C is a schematic view showing one of three states which the changeover mechanism shown in FIG. 1 can realize.

When the sleeve 54 is controlled to a non-connection position shown in FIG. 2C, the sleeve 54 spline-engages only with the connection piece 51. Accordingly, neither a power transmission path between the output shaft A3 of the T/M 20 and the output shaft A4 of the M/G 40, nor a power transmission path between the input shaft A2 of the T/M 20 and the output shaft A4 of the M/G 40 is realized/provided. This state is referred to as a "neutral state (non-connection state)".

As described above, the changeover mechanism 50 selectively changes the connection state (hereinafter, referred to as "a M/G-connection-state") of the output shaft A4 of the M/G 40 into one of "the IN-Connection State", "the OUT-Connection State", and "the neutral state", by controlling the changeover actuator 55 (to thereby control the position of the sleeve 54).

The output shaft A3 of the T/M 20 is connected with a differential mechanism D/F which is connected with a pair of drive wheels including a left drive wheel and a right drive wheel. It should be noted that a so-called final reduction ratio mechanism may be provided between the output shaft A3 of the T/M 20 and the differential mechanism D/F.

The present apparatus further comprises a wheel speed sensor 61 which detects a wheel speed of the drive wheels, an acceleration pedal opening degree sensor 62 which detects an operation amount of an acceleration pedal AP, and a shift position sensor 63 which detects a position of a shift lever SF.

The present apparatus further comprises an electronic control unit ECU 70. The ECU 70 controls the actuators 21, 31, and 55, based on information and so on from the sensors 61-63, to thereby control the gear position of the T/M 20, the state of the C/T 30, and the state of the changeover mechanism 50. Further, the ECU 70 controls the output (driving torque) of each of the E/G 10 and M/G 40.

The gear position of the T/M 20 is controlled based on a vehicle speed V obtained from the wheel speed sensor 61, a required driving torque Tr, and a position of the shift lever SF obtained from the shift position sensor 63. The required driving torque Ti (a torque of the output shaft A3 of the T/M 20) is calculated based on the operation amount of the acceleration pedal AP obtained from the acceleration pedal opening degree sensor 62. The operation amount of the acceleration pedal AP and the position of the shift lever SF are changed by the driver. When the position of the shift lever SF is at a position corresponding to a "manual mode", the gear position of the T/M 20 is basically set at a gear position selected by the driver who selects the gear position by operating the shift lever SF. On the other hand, when the position of the shift lever SF is at a position corresponding to an "automatic mode", the gear position of the T/M 20 is automatically controlled based on "a combination of the vehicle speed V and the required driving torque Tr", even when the shift lever SF is not operated.

The state-of-connecting of the C/T 30 is generally kept at the complete-connection state. The state-of-connecting of the C/T 30 is temporarily changed from a connection state to the shut-off state (1) while a shift up operation or a shift down operation of the T/M 20 is being carried out, or (2) when the position of the shift lever SF is at "the neutral position", etc. When the state-of-connecting of the C/T 30 is in the half-provide-half-shut state, the C/T 30 can adjust/vary a maximum torque which the C/T 30 can transmit (hereinafter, this maximum torque is referred to as "a clutch torque"). The clutch torque can be adjusted more precisely than the torque of the output shaft A1 of the E/G 10 itself. Accordingly, controlling/varying the clutch torque while maintaining the torque of the output shaft A1 of the E/G 10 at a value larger than the clutch torque allows "a torque transmitted to the input shaft A2 of the T/M 20, the transmitted torque being based on (owing to) the torque of the output shaft A1 of the E/G 10", to be adjusted more precisely.

The M/G 40 is used as a (driving) power source generating a driving torque for driving the vehicle together with the E/G 10 or by itself, or is used as a power source for starting the E/G 10. Further, the M/G 40 is used as an electric motor generator for generating a regeneration torque to provide a breaking force to the vehicle, or is used as an electric motor generator for generating an electric power which is supplied to and stored in a battery (not shown) of the vehicle.

Hereinafter, the torque of the output shaft A1 of the E/G 10 is referred to as "an E/G torque", and the torque of the output shaft A4 of the M/G 40 is referred to as "an M/G torque". A rotational speed of the output shaft A1 of the E/G 10 is referred to as "an E/G rotational speed", and a rotational speed of the output shaft A4 of the M/G 40 is referred to as "an M/G rotational speed". A torque transmitted to the output shaft A3 of the T/M 20, the torque being based on (or owing to) the E/G torque, is referred to as "an E/G side output torque Te". A torque transmitted to the output shaft A3 of the TIM 20, the torque being based on (or owing to) the M/G torque, is referred to as "an M/G side output torque Tm". The E/G side output torque Te is equal to a value obtained by multiplying the E/G torque by the transmission reduction ratio (when the C/T 30 is in the complete-connection state). In the IN-Connection State, the M/G side output torque Tm is equal to a value obtained by multiplying the M/G torque by the IN-connection reduction ratio Gin. In the OUT-Connection State, the M/G side output torque Tm is equal to a value obtained by multiplying the M/G torque by the OUT-connection reduction ratio Gout. The M/G side output torque Tm can be adjusted by adjusting the M/G torque. The E/G side output torque Te can be adjusted by adjusting the E/G torque or by adjusting the clutch torque.

Generally, in the present apparatus, a distribution (relative magnitude) between the E/G torque and the M/G torque is adjusted in such a manner that a sum of the E/G side output torque Te and the M/G side output torque Tm coincides with the required driving torque Tr, according to one of well-known methods.

In the changeover mechanism 50, the sleeve 54 is moved so that the M/G-connection-state is changed (over), when (and after) a changeover condition is satisfied. Hereinafter, the movement of the sleeve 54 is referred to as "a changeover operation". A start (commencement) of the changeover operation corresponds to a start (commencement) of the movement of the sleeve 54. An end (completion) of the changeover operation corresponds to an end (completion) of the movement of the sleeve 54. Whether or not the changeover condition is satisfied can be determined based on, for example, the combination of the vehicle speed V and the required driving torque Tr.

(Control of the E/G 10 and the M/G 40 with Respect to the Changeover Operation)

Next will be described an operation of the present apparatus in a case in which the changeover operation of the changeover mechanism 50 is carried out while the vehicle is running (driving), with reference to FIG. 3. FIG. 3 shows an example regarding a case in which the changeover mechanism 50 is maintained at OUT-Connection State before time t1, and the changeover condition of (for) a changeover "from the OUT-Connection State to the IN-Connection State" is satisfied at time t1 (or immediately before time t1).

In the example shown in FIG. 3, it is assumed that it is determined at time t1 (or immediately before time t1) that the E/G side output torque Te can reach (will be able to reach) the required driving torque Tr. It is also assumed that the gear position of the T/M 20 remains unchanged, and accordingly, a condition of "the IN-connection reduction ration Gin>the OUT-connection reduction ratio Gout" is satisfied. In FIG. 3, Ts is a total torque (=Te+Tm), Ne is the E/G rotational speed, and Nm is the M/G rotational speed.

Before time t1 (i.e., in the OUT-Connection State), the distribution between the E/G side output torque Te and the M/G side output torque Tm is adjusted based on the driving condition (running condition) of the vehicle, while the total torque Ts is maintained at a value equal to the required driving torque Tr.

When the changeover condition of the changeover "from the OUT-Connection State to the IN-Connection State" is satisfied at time t1 (or immediately before time t1), a period (hereinafter referred to as "a changeover adjusting period") is provided in which the E/G torque and the M/G torque are adjusted with respect to (regarding, in connection with) the changeover operation from the OUT-Connection State to the IN-Connection State. In the example shown in FIG. 3, the changeover adjusting period corresponds to a period from time t1 to time t6. The changeover adjusting period is composed of a first period (from time t1 to time t2), a second period (from time t2 to time t5), and a third period (from time t5 to time t6).

In the first period, the M/G torque is decreased and the E/G torque is increased in the OUT-Connection State in such a manner that Tm is decreased at a first decreasing inclination (>0) from a value at time t1 to zero, and Te is increased at a first increasing inclination (>0) from a value at time t1 to Tr, while Ts is maintained at the value equal to Tr.

In the second period, the M/G torque and the E/G torque are adjusted in such a manner that the M/G torque continues to be (or is maintained at) zero or a value close to zero, and Te is maintained at Tr. Consequently, Ts is maintained at the value equal to Tr. It should be noted that "the value close to zero" means a minute (extremely small) torque generated when the M/G rotational speed is adjusted with letting the output shaft A4 of the M/G 40 run idle in the second period (in a case in which the M/G-connection-state is in the neutral state), as described later. The minute torque does not contribute to (cause) an acceleration or a deceleration of the vehicle.

Further, in the second period, the M/G rotational speed Nm is adjusted with making the output shaft A4 of the M/G 40 run idle, in order to have the M/G rotational speed Nm coincide with a value (hereinafter referred to as "a rotational speed corresponding to the vehicle speed after the changeover") which corresponds to the vehicle speed in the M/G-connection-state (i.e., the IN-Connection State) after the changeover operation is completed. A time (timing) at which the M/G rotational speed Nm becomes equal to the rotational speed corresponding to the vehicle speed after the changeover is an end of the second period. As described before, in the present example, the condition of "the IN-connection reduction ration Gin>the OUT-connection reduction ratio Gout" is satisfied. Accordingly, the M/G rotational speed Nm with respect to the same vehicle speed increases by the changeover "from the OUT-Connection State to the IN-Connection State". Therefore, in the second period, M/G rotational speed Nm is increased from a value corresponding to the OUT-Connection State (a value at time t2) to a value corresponding to the IN-Connection State (a value at time t5).

Further, in this example, the changeover operation starts at a start time (at time t2) of the second period, and the changeover operation ends at an end time (at time t5) of the second period. More specifically, the sleeve 54 moves from the OUT-connection position (refer to FIG. 2B) to the non-connection position (refer to FIG. 2C) in a period from time t2 to time t3 so that the M/G-connection-state is changed from the OUT-Connection State to the neutral state. The sleeve 54 is maintained at the non-connection position in a period from time t3 to time t4 so that the M/G-connection-state is kept at the neutral state. The sleeve 54 moves from the non-connection position (refer to FIG. 2C) to the IN-connection position (refer to FIG. 2A) in a period from time t4 to time t5 so that the M/G-connection-state is changed from the neutral state to the IN-Connection State.

In the third period, the M/G torque is increased and the E/G torque is decreased in the IN-Connection State in such a manner that Tm is increased at a third increasing inclination (>0) from zero or the value close to zero to a value at time t6, and Te is decreased at a third decreasing inclination (>0) from the value equal to the Tr to a value at time t6, while Ts is maintained at the value equal to Tr.

After time t6 (i.e., in the IN-Connection State), the distribution between the E/G side output torque Te and the M/G side output torque Tm is again adjusted based on the driving condition of the vehicle, while the total torque Ts is maintained at the value equal to the required driving torque Tr.

The case in which the changeover operation for the changeover "from the OUT-Connection State to the IN-Connection State" has been described, with reference to FIG. 3. In the example shown in FIG. 3, the condition of "the IN-connection reduction ration Gin>the OUT-connection reduction ratio Gout" is satisfied, however, a condition of "the IN-connection reduction ration Gin<the OUT-connection reduction ratio Gout" may be satisfied. In this case, the M/G rotational speed Nm with respect to the same vehicle speed decreases by the changeover "from the OUT-Connection State to the IN-Connection State". Accordingly, in the second period (from time t2 to time t5), M/G rotational speed Nm is decreased.

Figure 4:
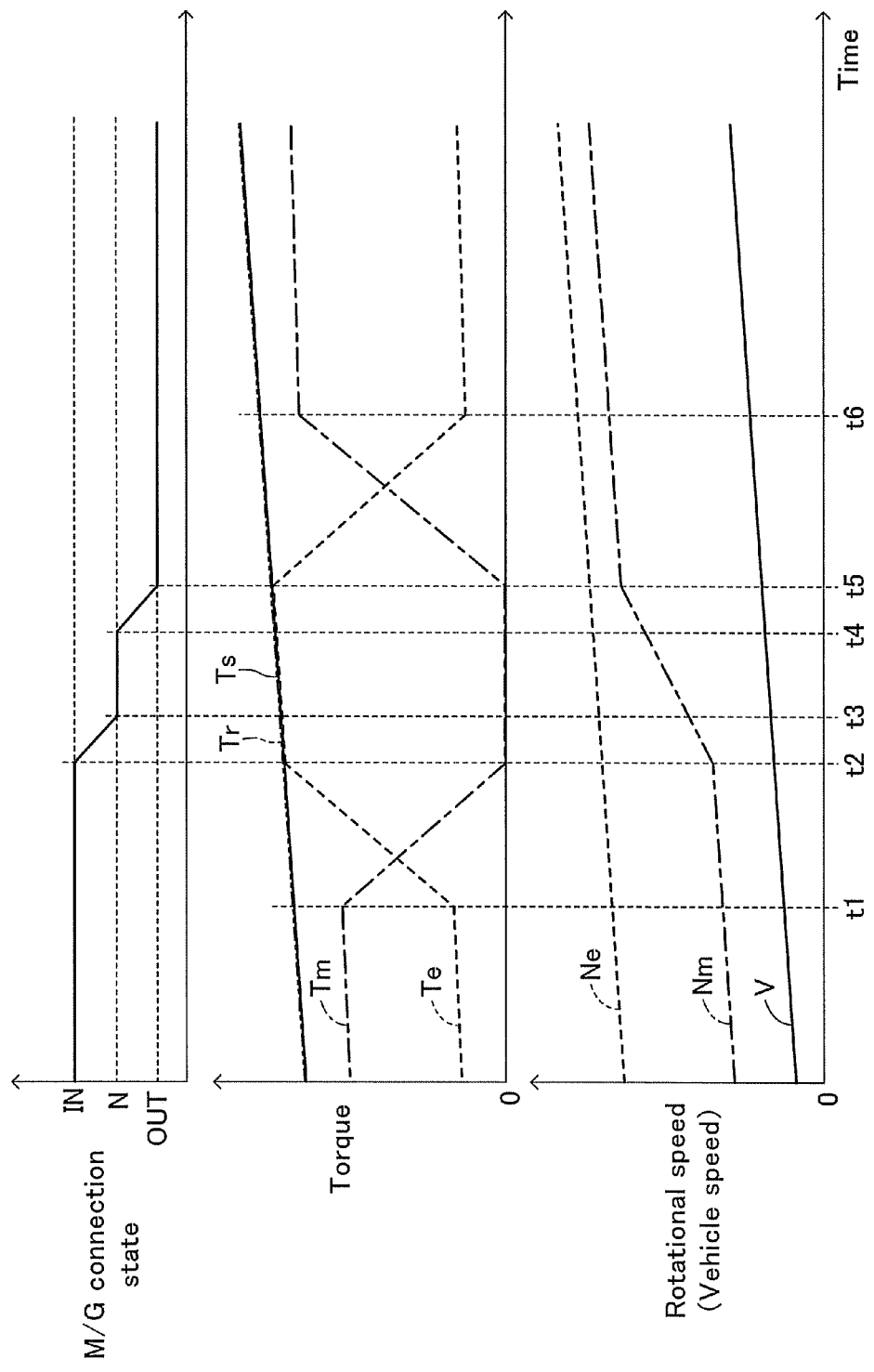
FIG. 4 is a time-line chart showing a change in control states of the E/G and the M/G in a case in which a changeover operation from the IN-Connection State to the OUT-Connection State is performed.

FIG. 4 shows an example of cases in which a changeover operation "from the IN-Connection State to the OUT-Connection State" is carried out and a condition of "the IN-connection reduction ration Gin<the OUT-connection reduction ratio Gout" is satisfied. In this example, similarly to the example shown in FIG. 3, the changeover adjusting period corresponds to a period from time t1 to time t6. The changeover adjusting period is composed of a first period (from time t1 to time t2), a second period (from time t2 to time t5), and a third period (from time t5 to time t6). Operations in the example shown in FIG. 4 are similar to the operations in the example shown in FIG. 3. Accordingly, a detailed description about the operations is omitted.

In the example shown in FIG. 4, the M/G rotational speed Nm with respect to the same vehicle speed increases by the changeover "from the IN-Connection State to the OUT-Connection State". Accordingly, in the second period (from time t2 to time t5), the M/G rotational speed Nm is increased. On the other hand, a condition of "the IN-connection reduction ration Gin>the OUT-connection reduction ratio Gout" may be satisfied. In this case, the M/G rotational speed Nm with respect to the same vehicle speed decreases by the changeover "from the IN-Connection State to the OUT-Connection State". Accordingly, in the second period (from time t2 to time t5), the M/G rotational speed Nm is decreased.

Figure 5:
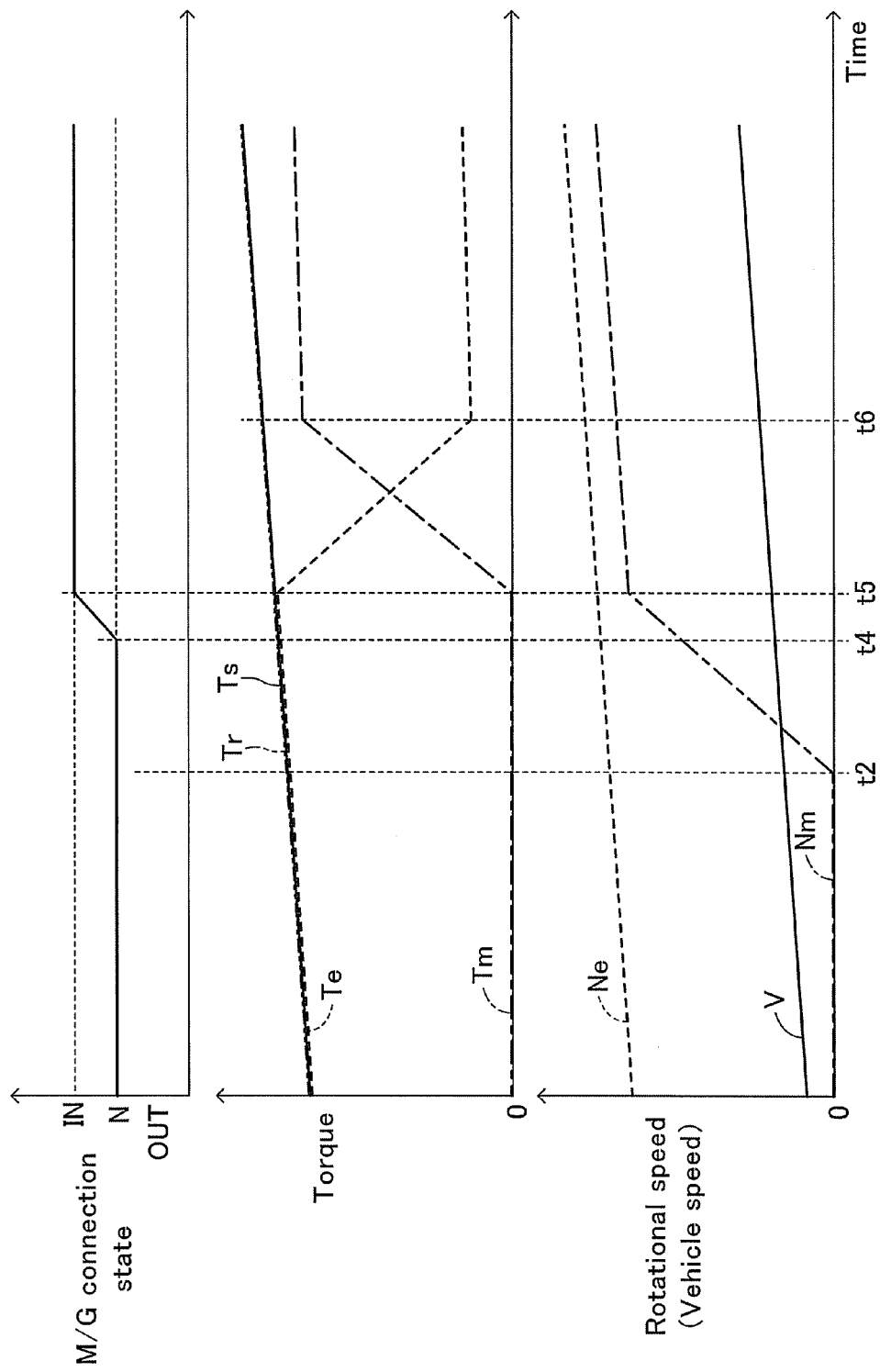
FIG. 5 is a time-line chart showing a change in control states of the E/G and the M/G in a case in which a changeover operation from the neutral state to the IN-Connection State is performed.

FIG. 5 shows an example of cases in which a changeover operation "from the neutral state to the IN-Connection State" is carried out. In this case, the changeover adjusting period corresponds to a period from time t2 to time t6. That is, there is no first period shown in FIG. 3. The changeover adjusting period is composed of a second period (from time t2 to time t5), and a third period (from time t5 to time t6). Operations in the example shown in FIG. 5 are also similar to the operations in the example shown in FIG. 3, except that there is no first period. Accordingly, a detailed description about the operations is omitted. In the example shown in FIG. 5, the changeover operation "from the neutral state to the IN-Connection State" is carried out, however, operations in a case in which a changeover operation "from the neutral state to the OUT-Connection State" is carried out are similar to the operations in the example shown in FIG. 5.

Figure 6:
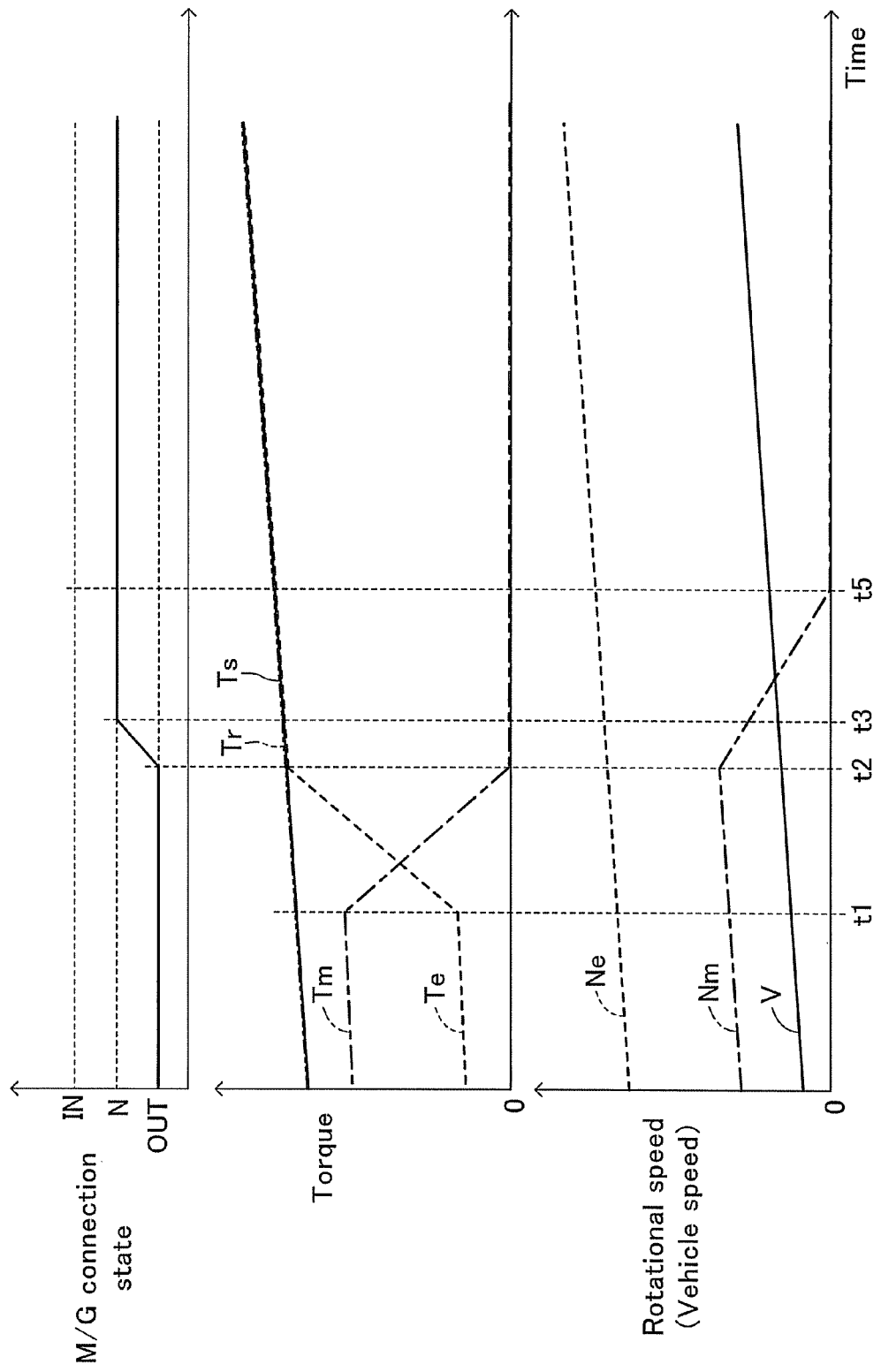
FIG. 6 is a time-line chart showing a change in control states of the E/G and the M/G in a case in which a changeover operation from the OUT-Connection State to the neutral state is performed.

FIG. 6 shows an example of cases in which a changeover operation "from the OUT-Connection State to the neutral state" is carried out. In this case, the changeover adjusting period corresponds to a period from time t1 to time t5. That is, there is no third period shown in FIG. 3. The changeover adjusting period is composed of a first period (from time t1 to time t2), and a second period (from time t2 to time t5). Operations in the example shown in FIG. 6 are also similar to the operations in the example shown in FIG. 3, except that there is no third period. Accordingly, a detailed description about the operations is omitted. In the example shown in FIG. 6, the changeover operation "from the OUT-Connection State to the neutral state" is carried out, however, operations in a case in which a changeover operation "from the IN-Connection State to the neutral state" is carried out are similar to the operations in the example shown in FIG. 6.

Next will be described the function/effect of the present apparatus. In the present apparatus, when the changeover condition of the M/G-connection-state is satisfied, the changeover adjusting period (e.g., the period from time t1 to time t6 in FIG. 3) is provided. In the changeover adjusting period, the M/G torque and the E/G torque are adjusted in such a manner that the changeover adjusting period includes the period (the period from time t2 to time t5 in FIG. 3) in which "the M/G torque is kept at zero (continues to be zero)". Accordingly, for example, as shown in FIG. 3, the changeover mechanism 50 is controlled so that the changeover operation starts and ends in the period in which "the M/G torque is kept at zero". Consequently, the sleeve 54 in the changeover mechanism 50 can be smoothly moved.

Further, in the case in which the E/G side output torque Te can reach the required driving torque Tr, the M/G torque and the E/G torque are adjusted over the changeover adjusting period in such a manner that the sum (=the total torque Ts) of the E/G side output torque Te and the M/G side output torque Tm coincides with the required driving torque Tr. Accordingly, an occurrence of a rapid change (shift shock with the changeover operation) in the acceleration in the front-rear direction of the vehicle can be suppressed, the rapid change being caused by the changeover operation.

Figure 7:
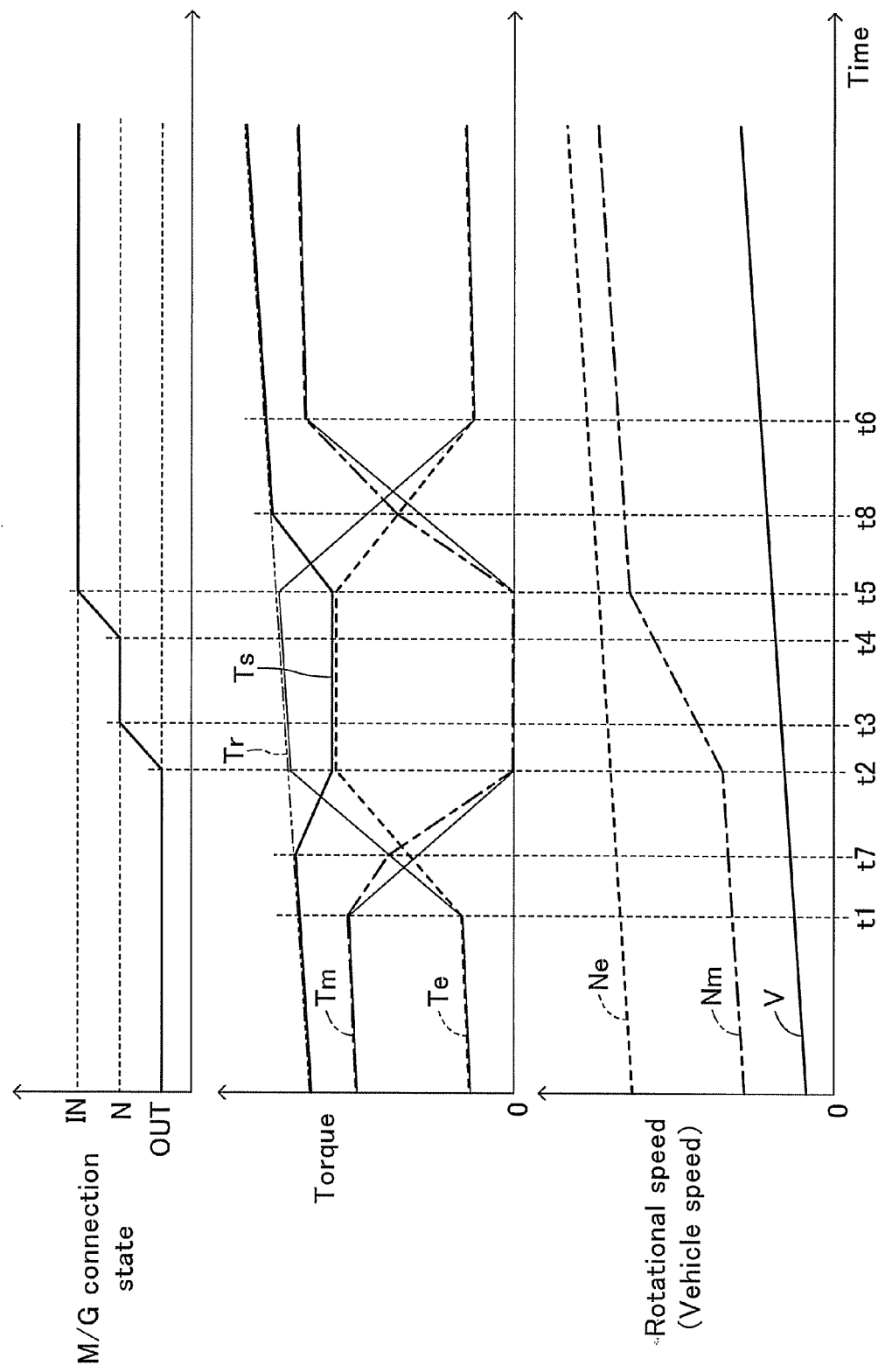
FIG. 7 is a time-line chart corresponding to FIG. 3, in a case in which an E/G side output torque Te can not reach a required driving torque in a changeover adjusting period.

The case in which the condition that the E/G side output torque Te can reach the required driving torque Tr is satisfied is described, hereinabove, with reference to FIGS. 3-6. Next will be described a case in which it is determined before the start of the changeover adjusting period that the E/G side output torque Te can not reach (will not be able to reach) the required driving torque Tr, with reference to FIG. 7. In FIG. 7, similarly to FIG. 3, an example of cases is shown in which the changeover operation "from the OUT-Connection State to the IN-Connection State" is carried out. In FIG. 7, a narrow solid line shows changes in Te and Tm (i.e., the changes in Te and Tm shown in FIG. 3) during the changeover adjusting period in the case in which Te can reach Tr. As shown in FIG. 7, in the case in which Te can not reach Tr, Te is maintained at a maximum value within a range in which Te can be adjusted during the second period (from time t2 to time t5).

In the case in which it is determined before the start of the changeover adjusting period (from time t1 to time t6) that Te can not reach (will not be able to reach) Tr, as shown in FIG. 7, the M/G torque is preferably controlled (refer to a heavy alternate long and short dash line) in the first period (from time t1 to time t2), in such a manner that a decreasing inclination (>0) of Tm is small compared to (is smaller than) the first decreasing inclination in the case in which Te can reach Tr (refer to the narrow solid line) during a period from the start of the first period to a predetermined/certain time in the middle of the first period (i.e., during the period from time t1 to time t7), and in such a manner that the decreasing inclination (>0) of Tm is large compared to (is larger than) the first decreasing inclination during a period from the predetermined/certain time to the end of the first period (i.e., during the period from time t7 to time t2). Further, in the first period (from time t1 to time t2), the E/G torque is preferably controlled (refer to a heavy dash line) in such a manner that the increasing inclination of Te is small compared to (is smaller than) the first increasing inclination in the case in which Te can reach Tr (refer to the narrow solid line) over the first period. The reason why the increasing inclination of Te is smaller than the first increasing inclination is that Te at the end of the first period (i.e., Te at time t2) is smaller than Tr, since Te can not reach Tr.

Consequently, in the changeover adjusting period (from time t1 to time t6), a state (hereinafter, referred to as "a torque shortage state") in which the total torque Ts does not reach the required driving torque Tr starts from time t7. To the contrary, if the decreasing inclination of Tm is set at the first decreasing inclination over the first period (refer to the narrow solid line), while the state is kept in which the increasing inclination of Te is smaller than the first increasing inclination over the first period (refer to the heavy dash line), the torque shortage state immediately starts from time t1. Accordingly, as understood from the description above, adjusting Te and Tm during the first period as shown in FIG. 7 can delay a start of the torque shortage state compared to the case in which the decreasing inclination of Tm is set at the first decreasing inclination over the first period (refer to the narrow solid line). Consequently, this can shorten a time period in which the torque shortage state continues.

Further, in the case in which it is determined in advance before the start of the changeover adjusting period (from time t1 to time t6) that Te can not reach Tr, as shown in FIG. 7, the M/G torque is preferably controlled (refer to the heavy alternate long and short dash line) in the third period (from time t5 to time t6), in such a manner that an increasing inclination of Tm is large compared to (is larger than) the third increasing inclination in the case in which Te can reach Tr (refer to the narrow solid line) during a period from the start of the third period to a predetermined (certain) time in the middle of the third period (i.e., during the period from time t5 to time t8), and in such a manner that the increasing inclination of Tm is small compared to (is smaller than) the third increasing inclination during a period from the predetermined (certain) time to the end of the third period (i.e., during the period from time t8 to time t6). Further, in the third period (from time t5 to time t6), the E/G torque is preferably controlled (refer to the heavy dash line) in such a manner that the decreasing inclination of Te (>0) is small compared to (is smaller than) the third decreasing inclination in the case in which Te can reach Tr (refer to the narrow solid line) over the third period. The reason why the decreasing inclination of Te is smaller than the third decreasing inclination is that Te at the start of the third period (i.e., Te at time t5) is smaller than Tr, since Te can not reach Tr.

Consequently, in the changeover adjusting period (from time t1 to time t6), the torque shortage state ends at time t8. To the contrary, if the increasing inclination of Tm is set at the third increasing inclination over the third period (refer to the narrow solid line), while the state is kept in which the decreasing inclination of Te is smaller than the third decreasing inclination over the third period (refer to the heavy dash line), the torque shortage state continues up to time t6. Accordingly, as understood from the description above, adjusting Te and Tm during the third period as shown in FIG. 7 can advance an end of the torque shortage state compared to the case in which the increasing inclination of Tm is set at the third increasing inclination over the third period (refer to the narrow solid line). Consequently, this can shorten the time period in which the torque shortage state continues.

Next will be additionally described timings of a start of the movement of the sleeve 54 in the changeover operation. The timings of a start of the movement of the sleeve 54 include a start timing (hereinafter, referred to as "an engagement release start timing") of the movement from either the IN-connection position or the Out-connection position to the non-connection position, as shown at time t2 in FIG. 3, and a start timing (hereinafter, referred to as "an engagement start timing") of the movement from the non-connection position to either the IN-connection position or the Out-connection position, as shown at time t4 in FIG. 3.

In the examples shown in FIGS. 3 and 4, the engagement release start timing is set at the end of the first period (that is, the engagement release start timing is set at the time (time t2) at which the M/G torque reaches zero), however, the engagement release start timing may be set at a timing in the middle of the first period or at a timing in the middle of the second period. In the case in which the engagement release start timing is set at the timing in the middle of the first period, the engagement release start timing may be set at a timing such that the end (time t3 in FIGS. 3 and 4) of the movement of the sleeve 54 from either the IN-connection position or the OUT-connection position to the non-connection position coincides with the end (time t2) of the first period.

In the examples shown in FIGS. 3 and 4, the engagement start timing is set at the timing (time t4) in the middle of the second period so that the end of the movement of the sleeve 54 from the non-connection position to either the IN-connection position or the OUT-connection position coincides with the start of the third period (i.e., the time (time t5) at which the M/G rotational speed Nm becomes equal to "the rotational speed corresponding to the vehicle speed after the changeover"). However, the engagement start timing may be set at the start of the third period or at a timing in the middle of the third period. Further, when the vehicle is accelerated, the engagement start timing may be set at a timing within a period in which the M/G rotational speed Nm is larger than "the rotational speed corresponding to the vehicle speed after the changeover". Further, when the vehicle is decelerated, the engagement start timing may be set at a timing within a period in which the M/G rotational speed Nm is smaller than "the rotational speed corresponding to the vehicle speed after the changeover".

Next will be additionally described the changeover condition of the M/G-connection-state. As described above, whether or not the changeover condition is satisfied can be determined based on, for example, the combination of the vehicle speed V and the required driving torque Tr. In this case, a selection of the M/G-connection-state is made using the map shown in FIG. 8, for example.

Figure 8:
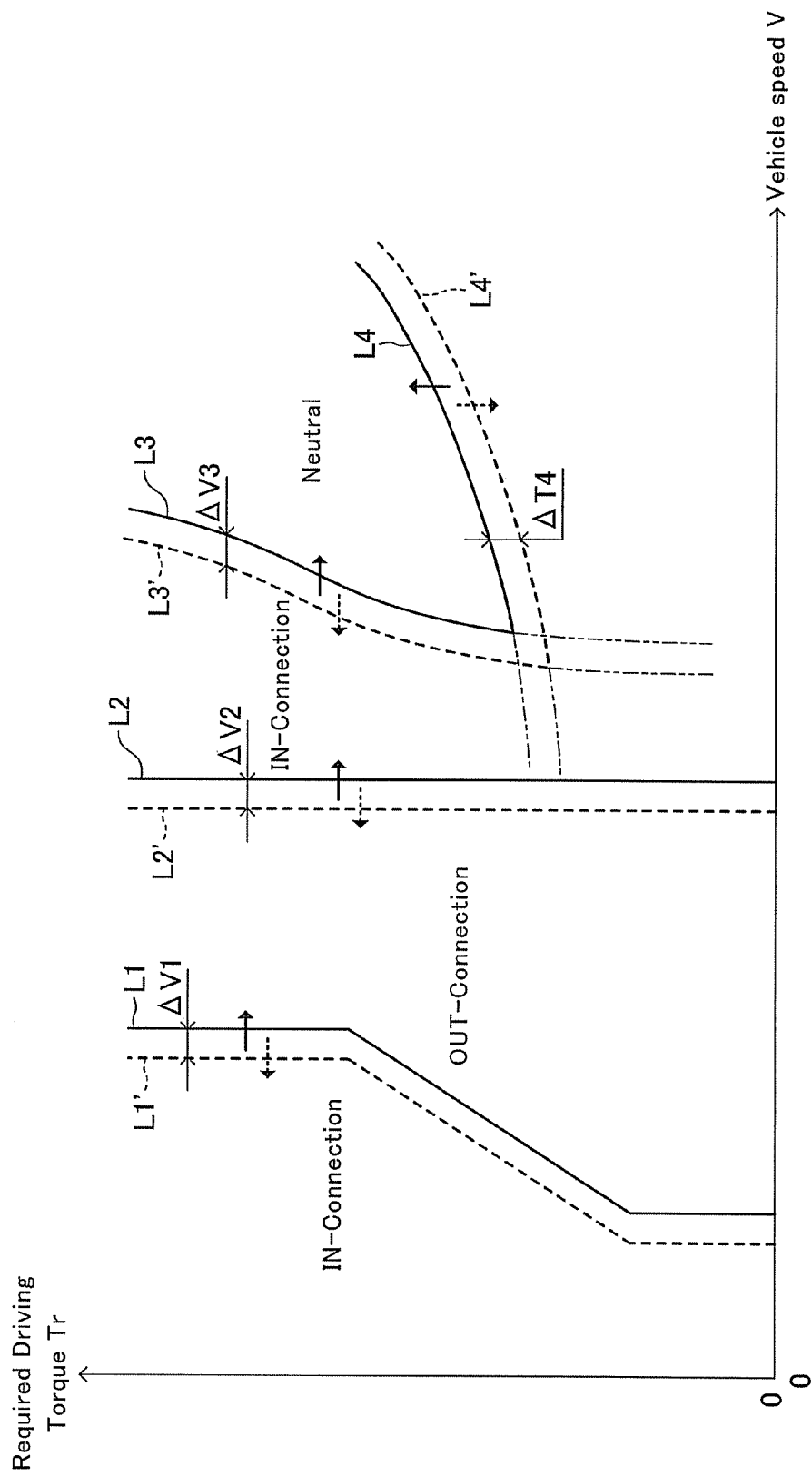
FIG. 8 is a graph showing an example of maps defining a relation between "a combination of a vehicle speed and a required driving torque" and a connection state selected in the changeover mechanism.

In a case in which the map shown in FIG. 8 is used, the vehicle starts running (driving) in the "IN-Connection State" in a period in which the vehicle speed V increases from zero. When the vehicle speed V passes over (thorough) a boundary line L1 while the vehicle speed V is increasing, the M/G-connection-state is changed from "the IN-Connection State" to "the OUT-Connection State". When the vehicle speed V passes over (thorough) a boundary line L2 while the vehicle speed V is increasing, the M/G-connection-state is changed from "the OUT-Connection State" to "the IN-Connection State". When the vehicle speed V passes over (thorough) a boundary line L3 while the vehicle speed V is increasing in a case in which the required driving torque Tr is larger than a boundary line L4, the M/G-connection-state is changed from "the IN-Connection State" to "the neutral state". Further, when the required driving torque Tr passes over (thorough) the boundary line L4 while the required driving torque Tr is increasing in a case in which the vehicle speed V is larger than the boundary line L3, the M/G-connection-state is changed from "the IN-Connection State" to "the neutral state".

On the other hand, while the vehicle speed V is decreasing, the M/G-connection-state is changed from "the neutral state" to "the IN-Connection State", when the vehicle speed V passes over a boundary line L3'. When the vehicle speed V passes over a boundary line L2' while the vehicle speed V is decreasing, the M/G-connection-state is changed from "the IN-Connection State" to "the OUT-Connection State". When the vehicle speed V passes over a boundary line L1' while the vehicle speed V is decreasing, the M/G-connection-state is changed from "the OUT-Connection State" to "the IN-Connection State". Further, when the required driving torque Tr passes over (thorough) the boundary line L4' while the required driving torque Tr is decreasing in a case in which the vehicle speed V is larger than the boundary line L3, the M/G-connection-state is changed from "the neutral state" to "the IN-Connection State".

The detailed description on the map shown in FIG. 8, such as details on how to set the boundary lines L1(L1'), L2(L2'), L3(L3'), and L4(L4'), etc., are described Japanese Patent Application 2009-57465 which is incorporated herein by reference.

Figure 9:
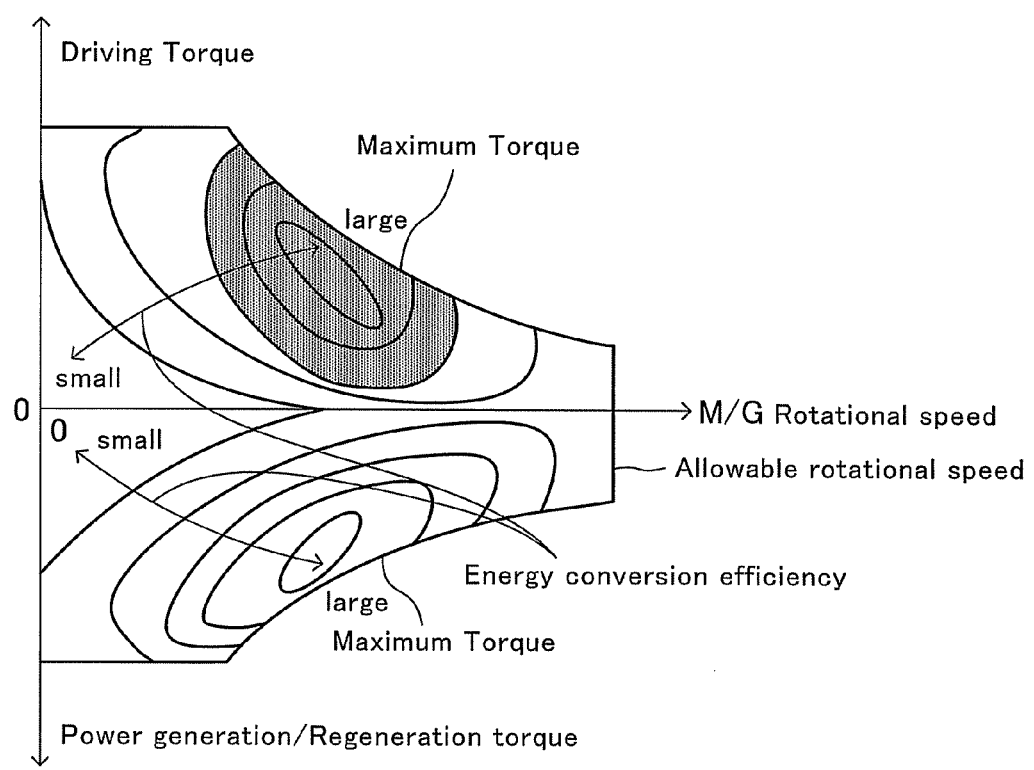
FIG. 9 is a graph showing a relation among a rotational speed of the M/G, a maximum torque which the M/G can generate, and an energy conversion efficiency of the M/G.

Alternatively, the M/G-connection-state may be changed over in consideration of a maximum torque which the M/G 40 can generate and an energy conversion efficiency (an efficiency in generating the torque) of the M/G 40. That is, as shown in FIG. 9, the maximum torque (M/G maximum torque) which the M/G 40 can generate is constant (the largest) when the M/G rotational speed is smaller than a certain value, and decreases as the M/G rotational speed increases when the M/G rotational speed is larger than the certain value. Further, the M/G 40 does not generate any torque when the M/G rotational speed is larger than an allowable rotational speed. In addition, the energy conversion efficiency can become the largest when the M/G rotational speed is at another certain value, and becomes smaller as an absolute value of a difference between the M/G rotational speed and the another certain value becomes larger.

Here, a value obtained by multiplying the M/G maximum torque (refer to FIG. 9) which corresponds to the M/G rotational speed corresponding to the current/present vehicle speed in "the IN-Connection State" by "the IN-connection reduction ration Gin" is defined as "an IN-connection M/G side maximum torque". Further, a value obtained by multiplying the M/G maximum torque (refer to FIG. 9) which corresponds to the M/G rotational speed corresponding to the current/present vehicle speed in "the OUT-Connection State" by "the OUT-connection reduction ration Gout" is defined as "an OUT-connection M/G side maximum torque". The IN-connection M/G side maximum torque means (is) a maximum torque transmitted to the output shaft A3 of the T/M 20 owing to the M/G torque when the M/G-connection-state is in the IN-Connection State. The OUT-connection M/G side maximum torque means (is) a maximum torque transmitted to the output shaft A3 of the T/M 20 owing to the M/G torque when the M/G-connection-state is in the OUT-Connection State. The maximum torque transmitted to the output shaft A3 of the T/M 20 owing to the M/G torque is referred to as "an M/G side maximum torque".

The changeover between the IN-Connection State and the OUT-Connection State may be carried out, in consideration of a relation among "the M/G rotational speed, the M/G maximum torque, and the energy conversion efficiency" as well as a magnitude relation between "the IN-connection M/G side maximum torque and the OUT-connection M/G side maximum torque". That is, for example, the changeover may be carried out in such a manner that one of connection states in which "the M/G side maximum torque" is larger than "the M/G side maximum torque in the other of the connection states" is selected, or in such a manner that one of connection states in which the energy conversion efficiency is larger than the energy conversion efficiency in the other of the connection states is selected.

Figure 10:
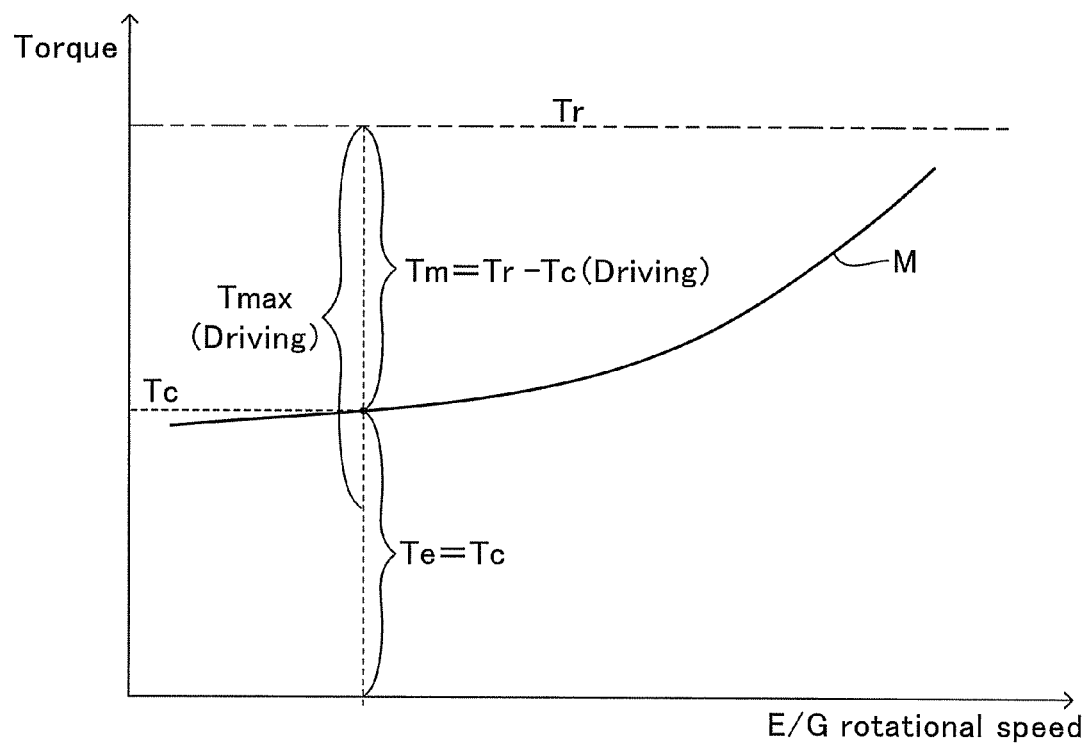
FIG. 10 is a figure for explaining a distribution between an E/G side output torque Te and an M/G side output torque Tm, when the required driving torque Tr is larger than a minimum fuel consumption rate torque Tc, and an M/G side maximum torque Tmax is larger than "Tr−Tc", in a case in which the E/G torque and the M/G torque are controlled in consideration of the fuel consumption rate of the E/G.

Alternatively, the changeover of the M/G-connection-state may be carried out in consideration of a fuel consumption rate of the E/G 10. That is, as shown by a curve line M in FIG. 10, the E/G 10 has a characteristic of a torque which minimizes the fuel consumption rate with respect to an E/G rotational speed. The torque (axis of ordinate) shown in FIG. 10 shows a torque of (regarding) the output shaft A3 of the T/M 20. That is, the torque corresponding to the curve line M shown in FIG. 10 (the torque being referred to as "a minimum fuel consumption rate torque Tc") corresponds to a value (i.e., the E/G side output torque) obtained by multiplying the E/G torque by the transmission reduction ratio Gtm.

Next will be described a case in which the E/G torque and the M/G torque are adjusted in such a manner that the total torque Ts (=the E/G side output torque Te+M/G side output torque Tm) becomes equal to (coincides with) the required driving torque Tr, and the E/G side output torque Te becomes as close to the minimum fuel consumption rate torque Tc as possible. Hereinafter, a current/present M/G-connection-state (i.e. either one of the IN-Connection State and the OUT-Connection State) is referred to as "an A-connection-state", and the other of the IN-Connection State and the OUT-Connection State is referred to as "an B-connection-state". "The M/G side maximum torque Tmax" in the A-connection-state is referred to as "Tmax", and "the M/G side maximum torque Tmax" in the B-connection-state is referred to as "Tmax".

Figure 11:
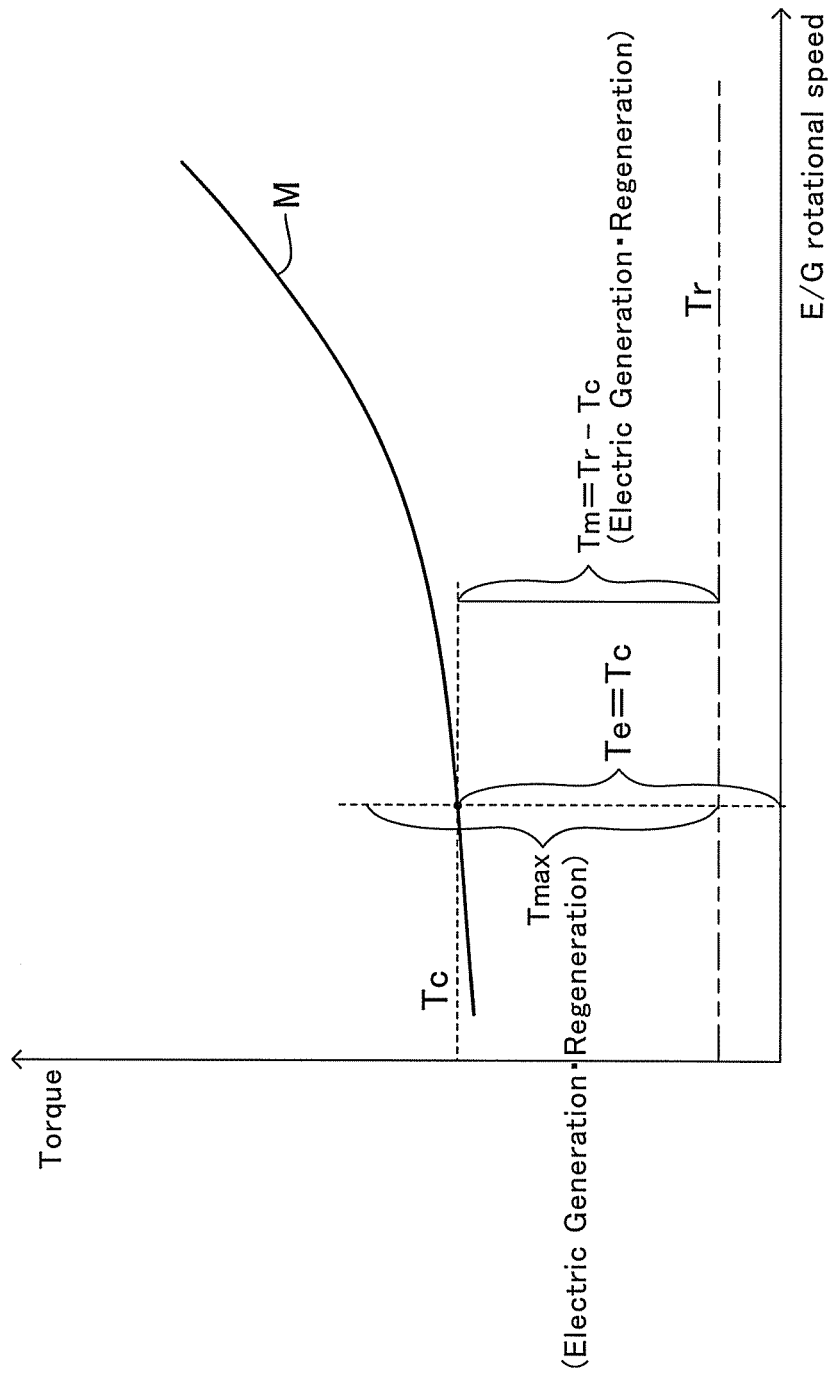
FIG. 11 is a figure for explaining a distribution between the E/G side output torque Te and the M/G side output torque Tm, when the required driving torque Tr is smaller than the minimum fuel consumption rate torque Tc, and the M/G side maximum torque Tmax is larger than "Tr−Tc", in the case in which the E/G torque and the M/G torque are controlled in consideration of the fuel consumption rate of the E/G.

In this case, more specifically, as shown in FIG. 10, the E/G torque and the M/G torque are adjusted in such a manner that Te becomes equal to Tc, and Tm becomes equal to "Tr−Tc", when Tmax (driving torque) is larger than "Tr−Tc" (i.e., this corresponds to the first condition described above") in a case in which Tr is larger than Tc (Tr>Tc). On the other hand, as shown in FIG. 11, the E/G torque and the M/G torque are adjusted in such a manner that Te becomes equal to Tc, and Tm (<0) becomes equal to "Tr−Tc", when |Tmax| (electric generation/regeneration torque) is larger than |Tr−Tc| (i.e., this corresponds to the first condition described above") in a case in which Tr is smaller than Tc (Tr<Tc). Consequently, Te can be made coincide with Tc, and the fuel consumption rate of the E/G 10 can be minimized with respect to the A-connection-state (=the current M/G-connection-state).

Figure 12:
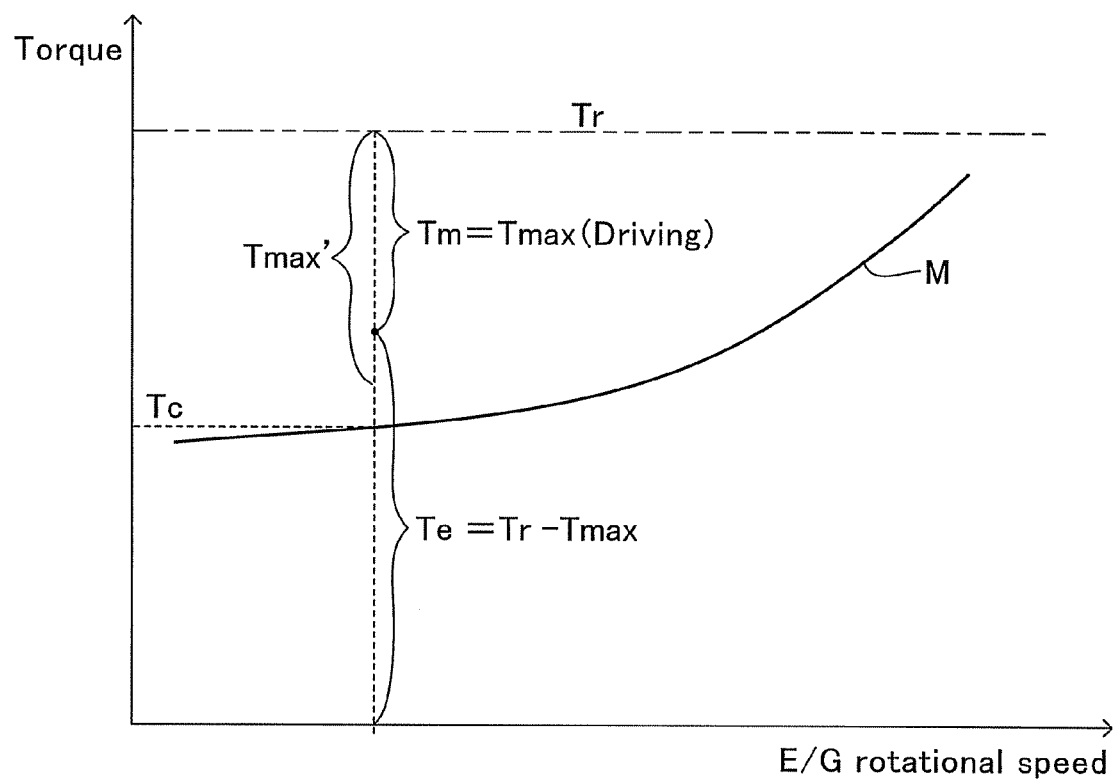
FIG. 12 is a figure corresponding to FIG. 10, in a case in which the M/G side maximum torque Tmax is smaller than "Tr−Tc"
Figure 13:
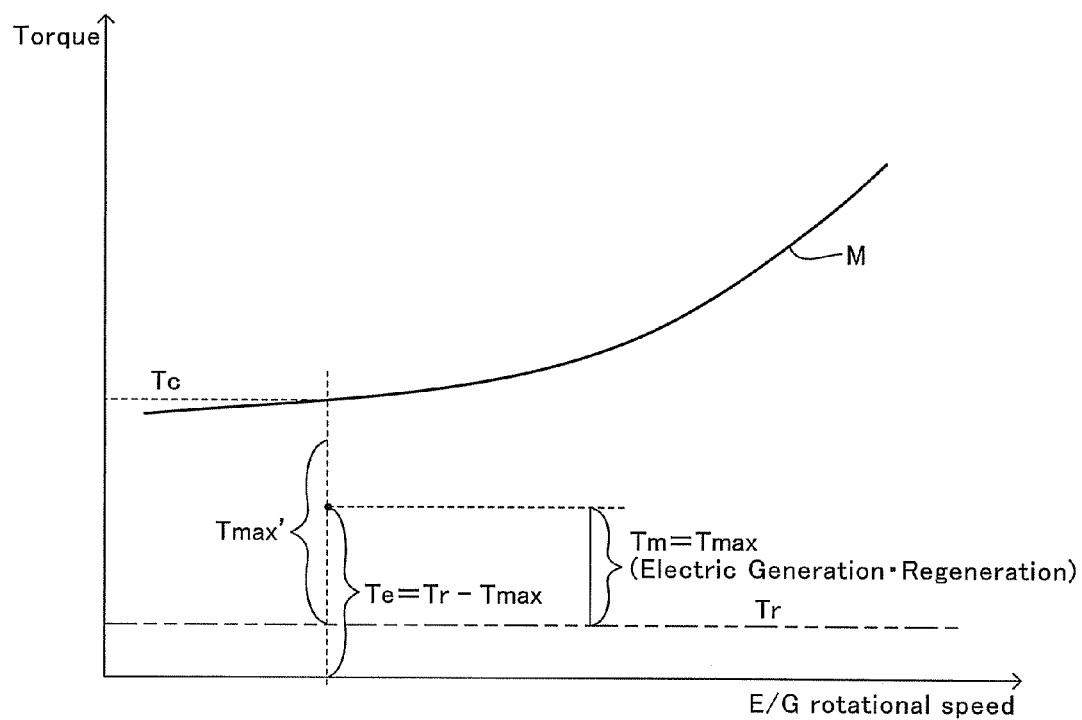
FIG. 13 is a figure corresponding to FIG. 11, in a case in which the M/G side maximum torque Tmax is smaller than "Tr−Tc".

In the meantime, as shown in FIG. 12, the E/G torque and the M/G torque are adjusted in such a manner that Te becomes equal to "Tr−Tmax", and Tm becomes equal to Tmax, when Tmax (driving torque) is smaller than "Tr−Tc" (i.e., this corresponds to the second condition described above") in a case in which Tr is larger than Tc (Tr>Tc). On the other hand, as shown in FIG. 13, the E/G torque and the M/G torque are adjusted in such a manner that Te becomes equal to "Ti−Tmax" (Tmax<0), and Tm (Tm<0) becomes equal to Tmax, when |Tmax| (electric generation/regeneration torque) is smaller than |Tr−Tc| (i.e., this corresponds to the second condition described above") in a case in which Ti is smaller than Tc (Ti<Tc). Accordingly, Te can become as close to Tc as possible by setting Tm at Tmax which is the largest. Consequently, the fuel consumption rate of the E/G 10 can be made as small as possible with respect to the A-connection-state (=the current M/G-connection-state).

Here, as shown in FIGS. 12 and 13, in a case in which Tmax is smaller than "Tr−Tc" (i.e., this corresponds to the second condition described above"), when Tmax is larger than Tmax', Te can be made to become much closer to to Tc by changing the M/G-connection-state from the A-connection-state (i.e., the current/present M/G-connection-state) to the B-connection-state. Accordingly, in this case, it is preferable that the M/G-connection-state be changed from the A-connection-state to the B-connection-state. This allows Te to be much closer to Tc. Consequently, the fuel consumption rate of the E/G 10 can be made to become much smaller.

It should be noted that, in FIGS. 10-13, the characteristic of a torque which minimizes the fuel consumption rate with respect to an E/G rotational speed is adopted as the characteristic shown by the curve line M, however, a different characteristic of a torque which can provide the best characteristic other than the fuel consumption rate of the E/G 10 with respect to an E/G rotational speed may be adopted.

The present invention is not limited to the embodiments described above, but may be modified as appropriate without departing from the scope of the invention. For example, in the embodiments described above, the so-called automated manual transmission which uses the multiple gear ratio transmission which does not include a torque converter is used as the transmission, however, the multiple gear ratio transmission or a continuously variable transmission (the so-called automatic transmission (AT)) may be used as the transmission, each including a torque convertor and automatically performing an gear position shifting operation in accordance with the driving condition of the vehicle. In this case, the C/T 30 is omitted.

Further, a transmission (the so-called manual transmission (MT)) may be used as the transmission, the manual transmission being a multiple gear ratio transmission which does not comprise the torque converter. The manual transmission performs gear position shifting operation (without using an actuator) directly by an operation of a link mechanism caused by an operating force which is applied to the shift lever from the driver.

Further, in the embodiments described above, the changeover mechanism 50 is configured so as to be able to select any one of "the IN-Connection State", "the OUT-Connection State", and "the neutral state", however, the changeover mechanism 50 may be configured so as to be able to select any one of "the neutral state" and "the IN-Connection State" only. Furthermore, the changeover mechanism 50 may be configured so as to be able to select any one of "the neutral state" and "the OUT-Connection State" only. Moreover, the changeover mechanism 50 may be configured so as to be able to select any one of "the IN-Connection State" and "the OUT-Connection State" only.

What is claimed is:

1. A vehicular power transmission control apparatus applied to a vehicle comprising an internal combustion engine and an electric motor as power sources, comprising:
    a transmission including an input shaft to provide a power transmission path between said input shaft of said transmission and an output shaft of said internal combustion engine, and an output shaft to provide a power transmission path between said output shaft of said transmission and drive wheels of said vehicle, wherein said transmission adjusts a transmission reduction ratio which is a ratio of a rotational speed of said input shaft of said transmission to a rotational speed of said output shaft of said transmission;
    a changeover mechanism changes a connection state of an output shaft of said electric motor to any one from two or more of an input-side-connection state, an output-side-connection state, and a non-connection state,
        said input-side-connection state being a state in which a power transmission path is provided between said output shaft of said electric motor and said input shaft of said transmission,
        said output-side-connection state being a state in which a power transmission path is provided between said output shaft of said electric motor and said output shaft of said transmission without involving said transmission, and
        said non-connection state being a state in which neither a power transmission path between said output shaft of said electric motor and said input shaft of said transmission, nor a power transmission path between said output shaft of said electric motor and said output shaft of said transmission is provided;
    required driving torque obtaining means for obtaining a required driving torque which is a driving torque required by a driver of said vehicle, based on an operation of an acceleration operating member by said driver;
    determining means for determining whether or not a changeover condition of said connection state of said output shaft of said electric motor is satisfied; and
    control means for controlling, based on at least said required driving torque, a torque of said output shaft of said internal combustion engine and a torque of said output shaft of said electric motor in such a manner that a sum of an internal-combustion-engine-side-output-torque and an electric-motor-side-output-torque becomes equal to said required driving torque, said internal-combustion-engine-side-output-torque being a torque which is transmitted to said output shaft of said transmission and which is owing to a torque of said output shaft of said internal combustion engine, and said electric-motor-side-output-torque is a torque which is transmitted to said output shaft of said transmission and which is owing to said torque of said output shaft of said electric motor, and for controlling said change over mechanism when and after said changeover condition is satisfied, wherein,
    said control means, when and after said changeover condition is satisfied, adjusts said torque of said output shaft of said internal combustion engine and said torque of said output shaft of said electric motor in such a manner that said sum of said internal-combustion-engine-side-output-torque and said electric-motor-side-output-torque becomes equal to said required driving torque over a changeover adjusting period which is a period in which said torque of said output shaft of said internal combustion engine and said torque of said output shaft of said electric motor are adjusted with respect to a changeover operation of said connection state of said output shaft of said electric motor, and in such a manner that a period in which said torque of said output shaft of said electric motor continues to be zero or a value close to zero is included within said changeover adjusting period, and so as to control said changeover mechanism in such a manner that said changeover operation is performed in said changeover adjusting period,
wherein said control means adjusts said torque of said output shaft of said internal combustion engine and said torque of said output shaft of said electric motor, in a case in which said connection state of said output shaft of said electric motor is in one of said input-side-connection state and said output-side-connection state, and when and after said changeover condition of the electric-motor-connection-state for changing from said one of said input-side-connection state and said output-side-connection state to the other one of said input-side-connection state and said output-side-connection state is satisfied, in such a manner that said changeover adjusting period is composed of a first period, a second period, and a third period,
said first period being a period in which said torque of the output shaft of the electric motor decreases toward zero or a value close to zero and said torque of the output shaft of the internal combustion engine increases,
said second period being a period in which said torque of the output shaft of the electric motor continues to be zero or said value close to zero and said internal-combustion-engine-side-output-torque coincides with said required driving torque, and
said third period being a period in which said torque of the output shaft of the electric motor increases from zero or said value close to zero and said torque of the output shaft of the internal combustion engine decreases, and
so as to control said changeover mechanism in such a manner that said changeover operation starts, at a changing time from said first period to said second period, or at a time close to said changing time from said first period to said second period, and ends at a changing time from said second period to said third period, or at a time close to said changing time from said second period to said third period.

2. A vehicular power transmission control apparatus according to claim 1, wherein said control means adjusts said torque of said output shaft of said internal combustion engine and said torque of said output shaft of said electric motor in said first period, in such a manner that, in a case in which it is determined that said internal-combustion-engine-side-output-torque cannot reach said required driving torque in said changeover adjusting period, a decreasing inclination of said torque of said output shaft of said electric motor is small in a period from a start of said first period to a certain timing in the middle of said first period and is large in a period from said certain timing in the middle of said first period to an end of said first period, and an increasing inclination of said torque of said output shaft of said internal combustion engine is small over said first period, compared to a case in which it is determined that said internal-combustion-engine-side-output-torque can reach said required driving torque in said changeover adjusting period.

3. A vehicular power transmission control apparatus according to claim 1, wherein said control means adjusts said torque of said output shaft of said internal combustion engine and said torque of said output shaft of said electric motor in said third period, in such a manner that, in said case in which it is determined that said internal-combustion-engine-side-output-torque can not reach said required driving torque in said changeover adjusting period, an increasing inclination of said torque of said output shaft of said electric motor is large in a period from a start of said third period to a certain timing in the middle of said third period and is small in a period from said certain timing in the middle of said third period to an end of said third period, and a decreasing inclination of said torque of said output shaft of said internal combustion engine is small over said third period, compared to said case in which it is determined that said internal-combustion-engine-side-output-torque can reach said required driving torque in said changeover adjusting period.

4. A vehicular power transmission control apparatus according to claim 1, wherein,
said control means controls said torque of said output shaft of said internal combustion engine and said torque of said output shaft of said electric motor, in a condition in which said torque of said output shaft of said internal combustion engine coincides with a best characteristic torque which allows a predetermined characteristic of said internal combustion engine to be the best, and in a first condition in which a required electric motor torque is within a range of a torque which said electric motor can generate, said required electric motor torque being a torque of said output shaft of said electric motor necessary to make said sum of said internal-combustion-engine-side-output-torque and said electric-motor-side-output-torque coincide with said required driving torque, in such a manner that said torque of said output shaft of said internal combustion engine coincides with said best characteristic torque, and said torque of said output shaft of said electric motor coincides with said required electric motor torque;
said control means further controls said torque of said output shaft of said internal combustion engine and said torque of said output shaft of said electric motor, in said condition in which said torque of said output shaft of said internal combustion engine coincides with said best characteristic torque, and in a second condition in which said required electric motor torque is out of said range of a torque which said electric motor can generate, in such a manner that said torque of said output shaft of said electric motor coincides with a maximum value within said range of a maximum torque which said electric motor can generate, and said torque of said output shaft of said internal combustion engine coincides with a torque necessary to make said sum of said internal-combustion-engine-side-output-torque and said electric-motor-side-output-torque coincide with said required driving torque; and
said determining means determines, in a case in which said connection state of said output shaft of said electric motor is in one of said input-side-connection state and said output-side-connection state, and in said second condition, when said torque of said output shaft of said internal combustion engine in the other one of said input-side-connection state and said output-side-connection state is closer to said best characteristic torque than said torque of said output shaft of said internal combustion engine in the one of said input-side-connection state and said output-side-connection state, that said changeover condition of the electric-motor-connection-state from the one of said input-side-connection state and said output-side-connection state to the other is satisfied.

5. A vehicular power transmission control apparatus according to claim 1, comprising a clutch mechanism, disposed between said output shaft of said internal combustion engine and said input shaft of said transmission, for shutting and providing a power transmission path between said output shaft of said internal combustion engine and said input shaft of said transmission, and wherein, said transmission is a multiple gear ratio transmission which does not comprise a torque converter and which can realize each of a plurality of predetermined reduction ratios different from one another as said transmission reduction ratio, and said control means, based on a driving condition of said vehicle, controls shutting and providing of said power transmission path by said clutch mechanism, and so as to control said transmission reduction ratio.

6. A vehicular power transmission control apparatus according to claim 1, wherein the apparatus comprises a single internal combustion engine and a single electric motor as power sources.

7. A vehicular power transmission control apparatus according to claim 1, wherein said changeover mechanism changes the connection state of the output shaft of the electric motor from one of said input-side-connection state and said output-said-connection state to any one of said input-side-connection state, said output-side-connection state and said non-connection state.

8. A vehicular power transmission control apparatus according to claim 1, wherein said input-side-connection state is a state in which said electric motor is connected to said input shaft of said transmission so that a ratio of a rotational speed of said output shaft of said electric motor to a rotational speed of said input shaft of said transmission is constant.

9. A vehicular power transmission control apparatus according to claim 1, wherein said output-side-connection state is a state in which said output shaft of said electric motor is connected to said output shaft of said transmission so that a ratio of a rotational speed of said output shaft of said electric motor to a rotational speed of said output shaft of said transmission is constant.

* * * * *